(12) United States Patent
Kim

(10) Patent No.: US 8,704,776 B2
(45) Date of Patent: *Apr. 22, 2014

(54) TERMINAL FOR DISPLAYING OBJECTS AND METHOD OF CONTROLLING THE SAME

(75) Inventor: Hyoung Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1120 days.

This patent is subject to a terminal disclaimer.

(21) Appl. No.: 12/358,070

(22) Filed: Jan. 22, 2009

(65) Prior Publication Data

US 2009/0227296 A1 Sep. 10, 2009

(30) Foreign Application Priority Data

Mar. 10, 2008 (KR) .................. 10-2008-0021895
Mar. 10, 2008 (KR) .................. 10-2008-0021896

(51) Int. Cl.
*G06F 3/041* (2006.01)
*G09G 5/00* (2006.01)

(52) U.S. Cl.
USPC .......................................... 345/173; 345/156

(58) Field of Classification Search
CPC .............. G06F 3/016; G06F 2203/013; G06F 2203/014; G06F 2203/015
USPC ..................... 345/173–179; 178/28.01–20.02
See application file for complete search history.

(56) References Cited

U.S. PATENT DOCUMENTS

| | | | | |
|---|---|---|---|---|
| 6,147,674 | A * | 11/2000 | Rosenberg et al. ........... | 345/157 |
| 6,219,032 | B1 * | 4/2001 | Rosenberg et al. ........... | 345/157 |
| 6,525,711 | B1 * | 2/2003 | Shaw et al. .................... | 345/156 |
| 6,792,398 | B1 * | 9/2004 | Handley et al. ................... | 703/2 |
| 7,039,866 | B1 * | 5/2006 | Rosenberg et al. ........... | 715/701 |
| 7,089,292 | B1 * | 8/2006 | Roderick et al. .............. | 709/217 |
| 7,119,789 | B1 * | 10/2006 | Shaw et al. .................... | 345/156 |
| 2001/0045941 | A1 * | 11/2001 | Rosenberg et al. ........... | 345/161 |
| 2002/0033795 | A1 | 3/2002 | Shahoian et al. | |
| 2002/0095224 | A1 * | 7/2002 | Braun et al. ..................... | 700/44 |
| 2003/0100969 | A1 * | 5/2003 | Jones .............................. | 700/97 |

(Continued)

FOREIGN PATENT DOCUMENTS

| | | |
|---|---|---|
| CN | 1875335 | 12/2006 |
| KR | 10-0807930 | 2/2008 |
| WO | 99/38064 | 7/1999 |
| WO | 01/28194 | 4/2001 |

OTHER PUBLICATIONS

Ivan Poupyrev et al., "Tactile Interfaces for Small Touch Screens", Proceedings of the 16th Annual ACM Symposium on User Interface Software and Technology, vol. 5, Issue 2, pp. 217-220, Jan. 2003, XP-002516572.

(Continued)

*Primary Examiner* — Vijay Shankar
*Assistant Examiner* — Patrick F Marinelli
(74) *Attorney, Agent, or Firm* — Lee, Hong, Degerman, Kang & Waimey

(57) ABSTRACT

A mobile terminal is presented. The mobile terminal includes a touchscreen for displaying an object, an output unit for outputting a vibration when the object is selected and moved along a display area of the touchscreen, and a control unit for controlling a characteristic of the vibration according to at least one of an attribute of the object, an attribute of the display area, or a combination thereof.

18 Claims, 25 Drawing Sheets

(56) References Cited

U.S. PATENT DOCUMENTS

| | | | |
|---|---|---|---|
| 2003/0117371 A1* | 6/2003 | Roberts et al. | 345/156 |
| 2003/0128208 A1* | 7/2003 | Shih et al. | 345/419 |
| 2004/0113931 A1* | 6/2004 | Anderson | 345/701 |
| 2004/0183782 A1 | 9/2004 | Shahoian et al. | |
| 2005/0184696 A1* | 8/2005 | Anastas et al. | 318/567 |
| 2005/0231489 A1* | 10/2005 | Ladouceur et al. | 345/184 |
| 2006/0095864 A1* | 5/2006 | Mock et al. | 715/810 |
| 2006/0132457 A1* | 6/2006 | Rimas-Ribikauskas et al. | 345/173 |
| 2006/0187215 A1* | 8/2006 | Rosenberg et al. | 345/173 |
| 2006/0192771 A1* | 8/2006 | Rosenberg et al. | 345/173 |
| 2006/0209037 A1* | 9/2006 | Wang et al. | 345/173 |
| 2007/0013677 A1* | 1/2007 | Rosenberg et al. | 345/173 |
| 2007/0040815 A1* | 2/2007 | Rosenberg et al. | 345/173 |
| 2007/0091063 A1* | 4/2007 | Nakamura et al. | 345/156 |
| 2007/0229478 A1* | 10/2007 | Rosenberg et al. | 345/173 |
| 2007/0236450 A1* | 10/2007 | Colgate et al. | 345/156 |
| 2007/0268256 A1* | 11/2007 | Mankaruse et al. | 345/167 |
| 2008/0059131 A1* | 3/2008 | Tokita et al. | 703/5 |
| 2008/0060856 A1* | 3/2008 | Shahoian et al. | 178/18.03 |
| 2008/0062143 A1* | 3/2008 | Shahoian et al. | 345/173 |
| 2008/0062144 A1* | 3/2008 | Shahoian et al. | 345/173 |
| 2008/0062145 A1* | 3/2008 | Shahoian et al. | 345/173 |
| 2008/0068348 A1* | 3/2008 | Rosenberg et al. | 345/173 |
| 2008/0068349 A1* | 3/2008 | Rosenberg et al. | 345/173 |
| 2008/0068350 A1* | 3/2008 | Rosenberg et al. | 345/173 |
| 2008/0068351 A1* | 3/2008 | Rosenberg et al. | 345/173 |
| 2008/0072157 A1* | 3/2008 | Pally | 715/738 |
| 2008/0165131 A1* | 7/2008 | Kim et al. | 345/168 |
| 2008/0204426 A1* | 8/2008 | Hotelling et al. | 345/173 |
| 2008/0238635 A1* | 10/2008 | Klinghult et al. | 340/407.1 |
| 2008/0307330 A1* | 12/2008 | Louch et al. | 715/763 |
| 2009/0122018 A1* | 5/2009 | Vymenets et al. | 345/173 |
| 2009/0135164 A1* | 5/2009 | Kyung et al. | 345/179 |
| 2009/0153478 A1* | 6/2009 | Kerr et al. | 345/158 |
| 2009/0167701 A1* | 7/2009 | Ronkainen | 345/173 |
| 2009/0231271 A1* | 9/2009 | Heubel et al. | 345/156 |
| 2009/0319892 A1* | 12/2009 | Wright et al. | 715/701 |
| 2010/0013613 A1* | 1/2010 | Weston | 340/407.2 |
| 2010/0013761 A1* | 1/2010 | Birnbaum et al. | 345/156 |
| 2010/0127999 A1* | 5/2010 | Kim et al. | 345/173 |
| 2010/0141410 A1* | 6/2010 | Aono et al. | 340/407.2 |
| 2010/0231539 A1* | 9/2010 | Cruz-Hernandez et al. | 345/173 |
| 2010/0231540 A1* | 9/2010 | Cruz-Hernandez et al. | 345/173 |
| 2010/0231541 A1* | 9/2010 | Cruz-Hernandez et al. | 345/173 |
| 2010/0231550 A1* | 9/2010 | Cruz-Hernandez et al. | 345/174 |
| 2010/0315345 A1* | 12/2010 | Laitinen | 345/173 |
| 2011/0018697 A1* | 1/2011 | Birnbaum | 340/407.2 |
| 2011/0055773 A1* | 3/2011 | Agarawala et al. | 715/863 |
| 2011/0254671 A1* | 10/2011 | Okimoto et al. | 340/407.1 |
| 2013/0201141 A1* | 8/2013 | Birnbaum et al. | 345/173 |

OTHER PUBLICATIONS

Topi Kaaresoja et al., "Snap-Crackle-Pop: Tactile Feedback for Mobile Touch Screens", Jul. 2006, XP-002551465.

Ivan Poupyrev et al., "Haptic Feedback for Pen Computing: Directions and Strategies", Proceedings of CHI, Apr. 2004, XP-007910417.

Mélisande Biet' et al., "Discrimination of Virtual Square Gratings by Dynamic Touch on Friction Based Tactile Displays", Haptic Interfaces for Virtual Environment and Teleoperator Systems, Mar. 2008, XP-031339918.

* cited by examiner

FIG. 9
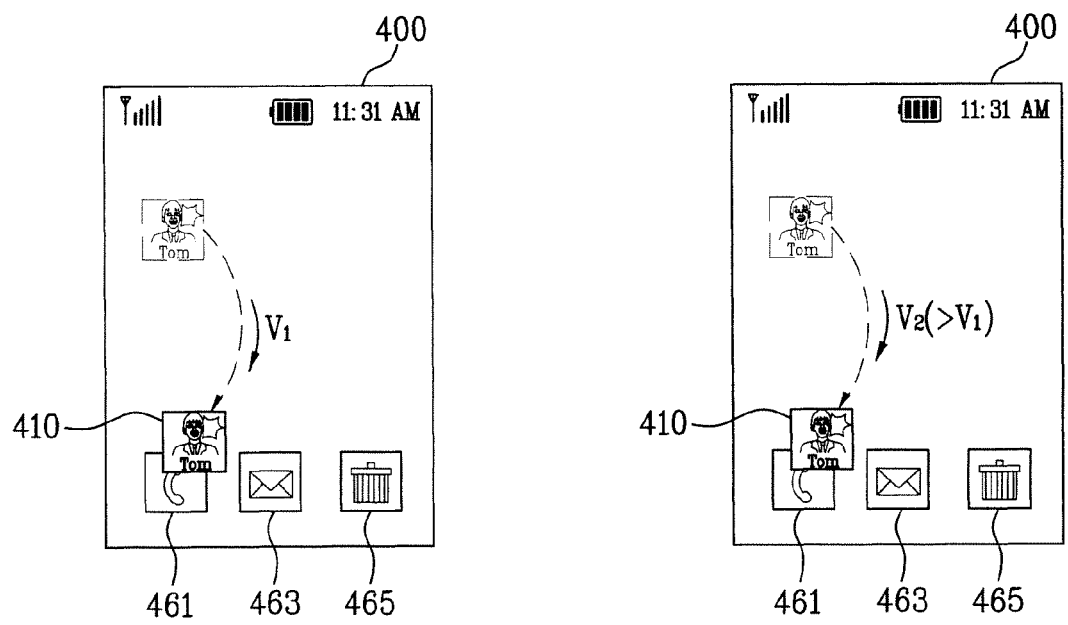
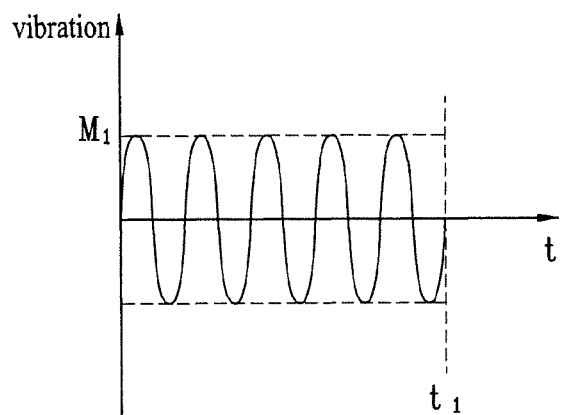
(9-1)
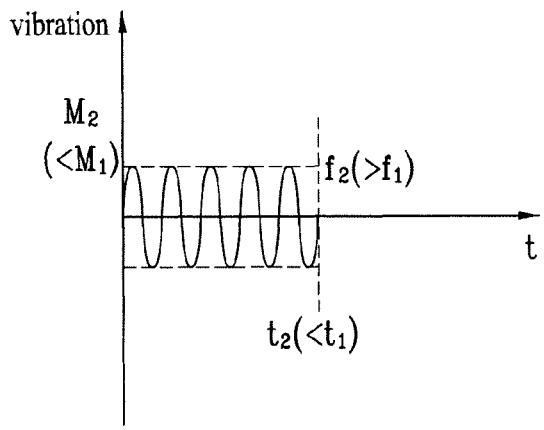
(9-2)

FIG. 15
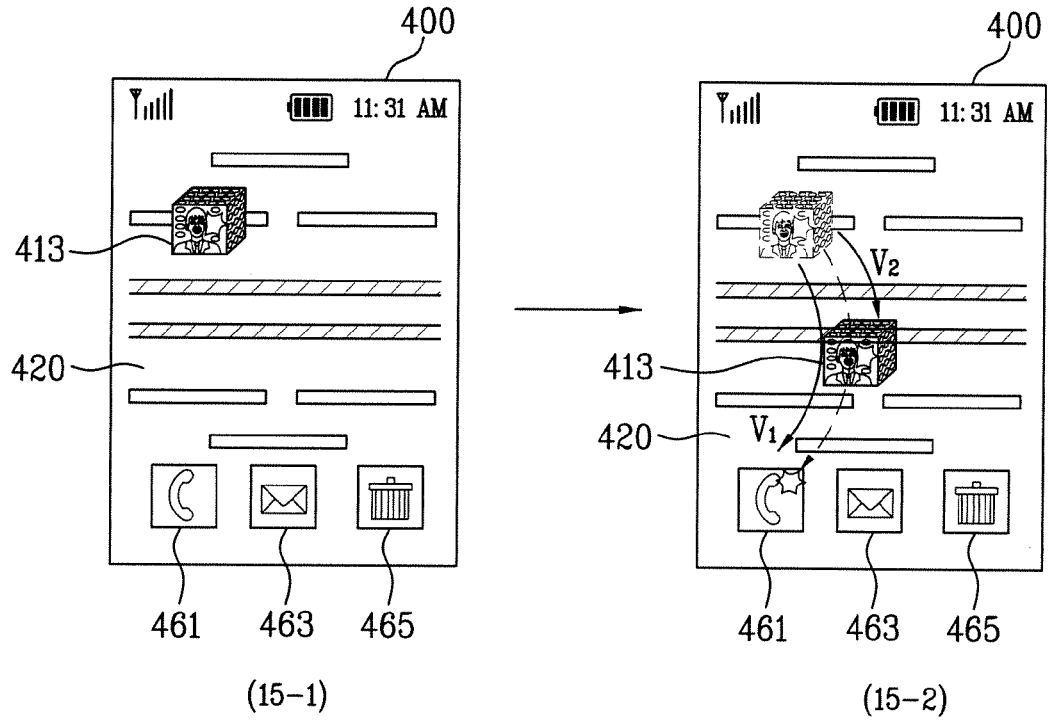
(15-1)  (15-2)
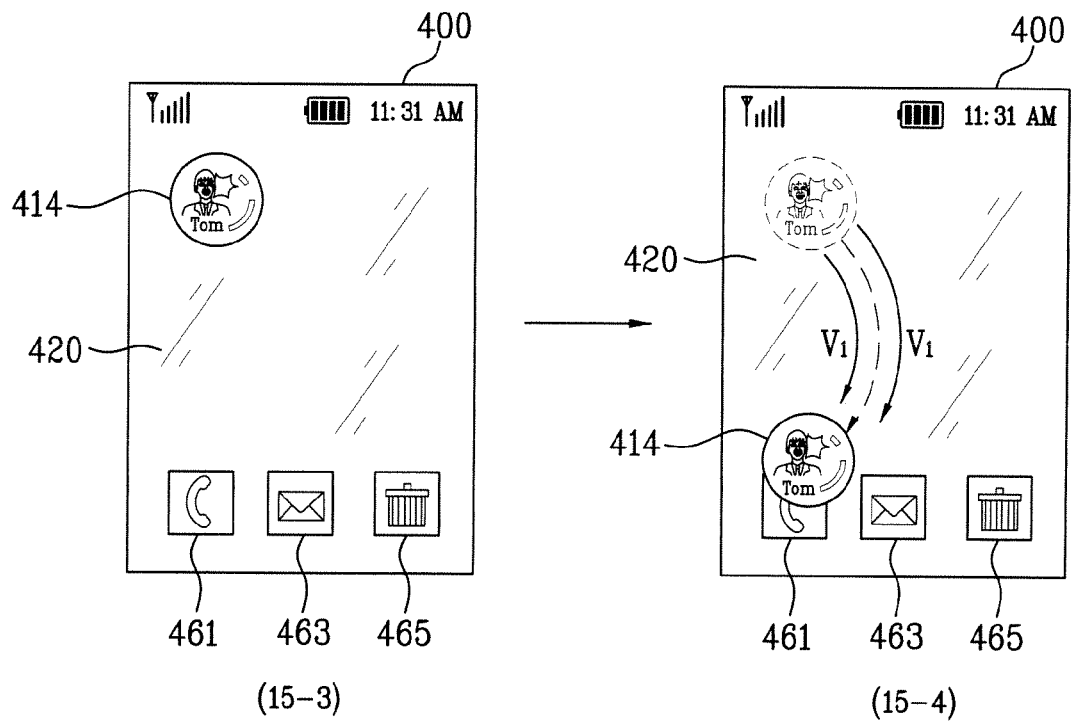
(15-3)  (15-4)

FIG. 20
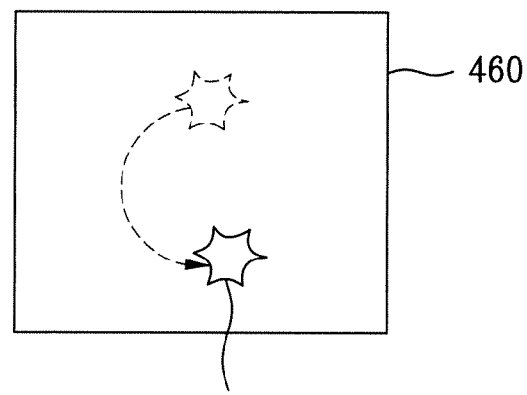
1st touch area
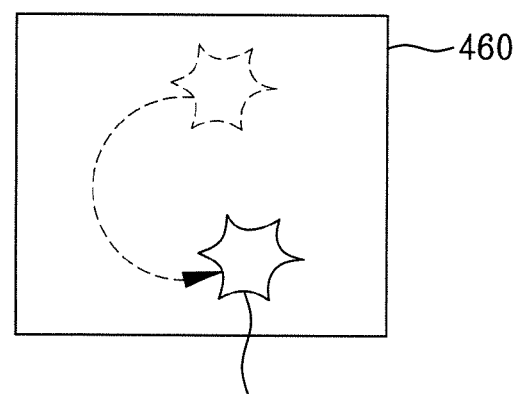
2nd touch area
(> 1st touch area)
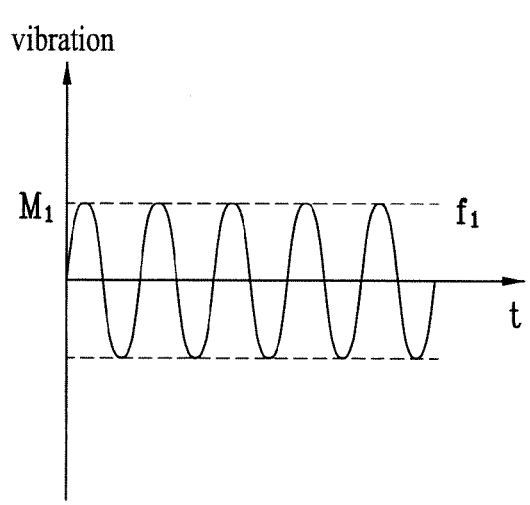
(20-1)
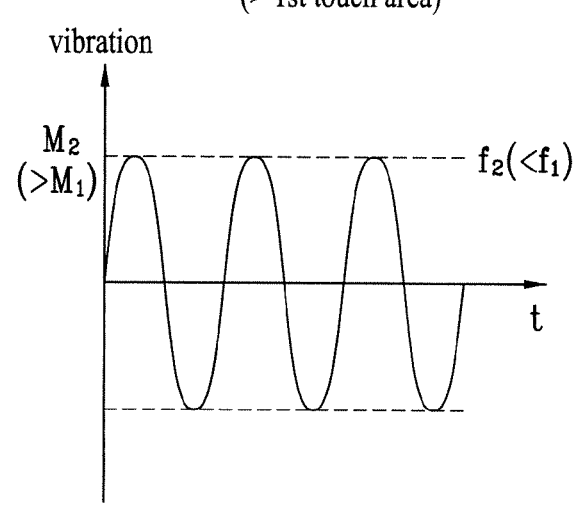
(20-2)

FIG. 22
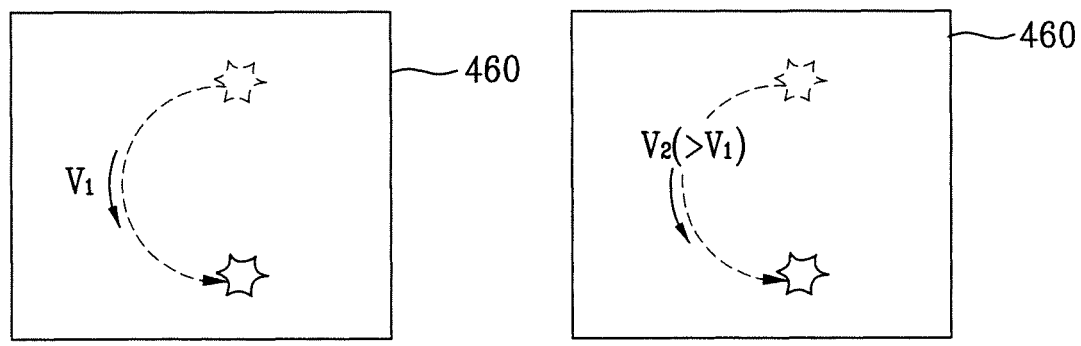
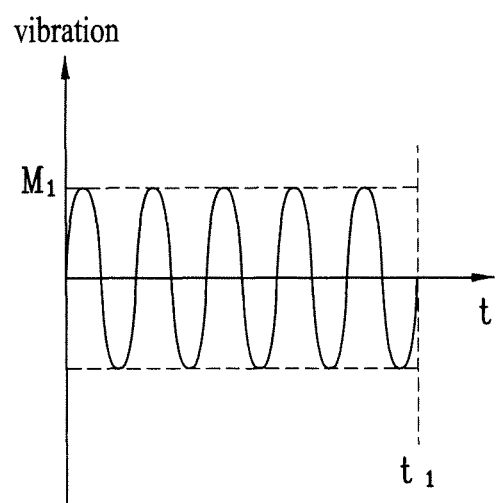
(22-1)
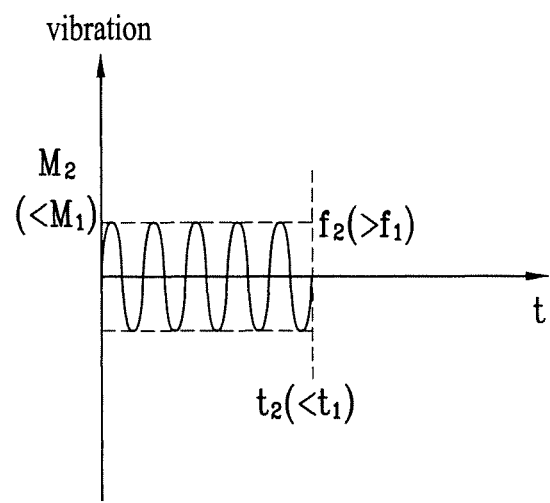
(22-2)

FIG. 24
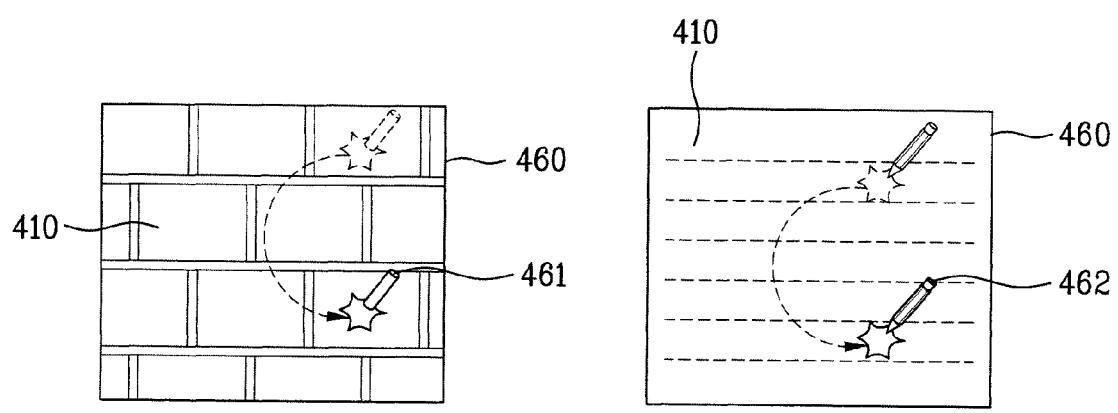
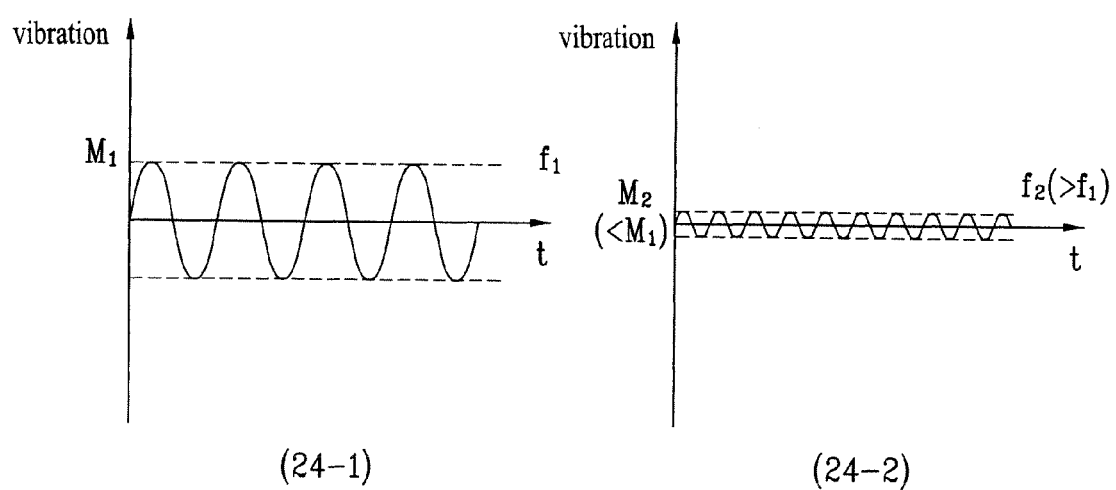
(24-1)            (24-2)

TERMINAL FOR DISPLAYING OBJECTS AND METHOD OF CONTROLLING THE SAME

This application claims the benefit of the Korean Patent Application Nos. 10-2008-0021895, filed on Mar. 10, 2008, and 10-2008-0021896 filed on Mar. 10, 2008, which are hereby incorporated by reference as if fully set forth herein.

BACKGROUND OF THE INVENTION

1. Field of the Invention

The present invention relates to a terminal, specifically, to a terminal and method of controlling the vibration output from a terminal.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

There are ongoing efforts to support and increase the functionality of mobile terminals. Such efforts include software and hardware improvements, as well as changes and improvements in the structural components which form the mobile terminal.

Recently, terminals have been provided with touchscreens. There is a demand for facilitating a user to feel the shift of the pointer when the pointer is touched and dragged on the touchscreen during handwriting, drawing, and icon shifting on the touchscreen of the terminal.

SUMMARY OF THE INVENTION

Accordingly, the present invention is directed to a terminal and method of controlling the same that substantially obviate one or more problems due to limitations and disadvantages of the related art.

An object of the present invention is to provide a terminal and method of controlling the same, by which a user to feelingly recognize that the touch shift of the pointer is correctly performed when a pointer is touched and dragged on a touchscreen for handwriting, drawing, icon shift and the like on the touchscreen of the terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one embodiment of the present invention, a mobile terminal is provided. The mobile terminal includes a touchscreen for displaying an object, an output unit for outputting a vibration when the object is selected and moved along a display area of the touchscreen, and a control unit for controlling a characteristic of the vibration according to at least one of an attribute of the object, an attribute of the display area, or a combination thereof.

In one feature, the control unit controls the vibration characteristic according to a type of virtual material comprising the display area on the touchscreen. Additionally, the control unit controls the vibration characteristic according to a type of virtual material comprising the object on the touchscreen.

In another feature, the type of virtual material comprising the display area is set as a background on the touchscreen and the type of virtual material comprising the object is represented as an image on the touchscreen.

In yet another feature, the control unit controls the vibration characteristic according to a size of the object. Additionally, the control unit controls the vibration characteristic according to a speed of the object moving along the display area. Furthermore, the control unit controls the vibration characteristic according to a virtual frictional force between the type of virtual material comprising the display area and the type of virtual material comprising the object. Moreover, the control unit controls the vibration characteristic according to a contact pressure of a pointer on the display area used to select the object. Finally, the control unit outputs a sound when the object moves along the display area.

In still yet another embodiment, the virtual material comprising the display area is magnetic, the virtual material comprising the object is magnetic, and the control unit controls the vibration characteristic according to a magnetic relationship between the magnetic virtual material comprising the display area and the magnetic virtual material comprising the object. Additionally, the control unit controls the vibration characteristic according to a presence of another object displayed on the display area comprising a magnetic virtual material.

In one feature, the virtual material comprising the display area is water, and the control unit controls the vibration characteristic according to whether the virtual material comprising the object floats on water. Additionally, the control unit controls the output unit to not output the vibration when the object is selected but not moved along the display area.

In another embodiment, a method of vibrating a mobile terminal is presented. The method includes displaying an object on a touchscreen, outputting a vibration when the object is selected and moved along a display area, and controlling a characteristic of the vibration according to at least one of an attribute of the object, an attribute of the display area, or a combination thereof.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 7 to 9 are diagrams for various patterns of vibration output by a method of controlling a mobile terminal according to a first embodiment of the present invention.

FIG. 15 is a state diagram of a display screen on which a method of controlling a mobile terminal according to a third embodiment of the present invention is implemented;

FIGS. 20 to 22 are diagrams for various patterns of vibration outputted by a method of controlling a mobile terminal according to a fifth embodiment of the present invention;

FIG. 24 and FIG. 25 are diagrams for various patterns of vibration outputted by a method of controlling a mobile terminal according to a sixth embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. It is to be understood by those of ordinary skill in this technological field that other embodiments may be utilized, and structural, electrical, as well as procedural changes may be made without departing from the scope of the present invention.

As used herein, the suffixes 'module', 'unit' and 'part' are used for elements in order to facilitate the disclosure only. So, significant meanings or roles are not given to the suffixes themselves and it is understood that the 'module', 'unit' and 'part' can be used together or interchangeably.

Figure 1:
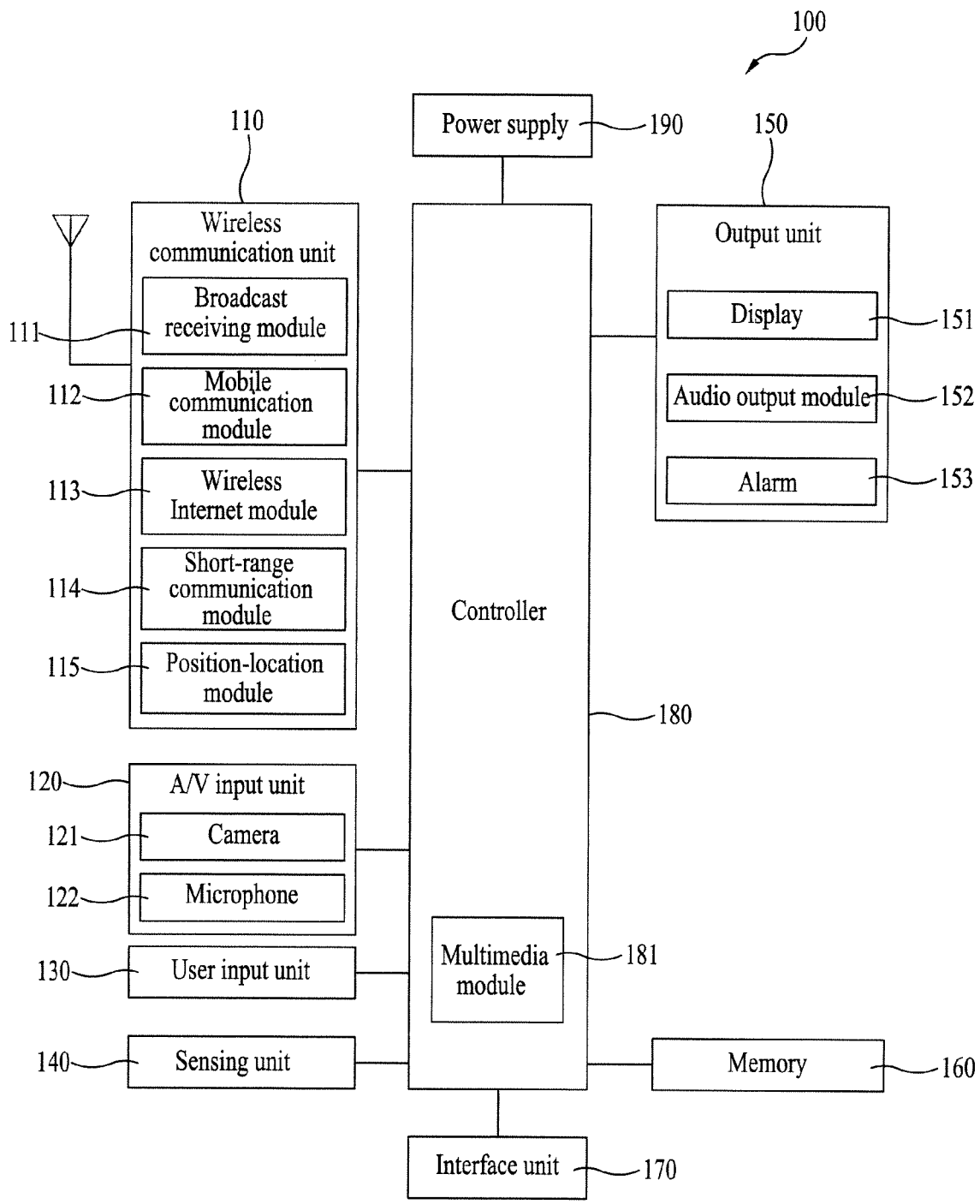
FIG. 1 is a block diagram of a mobile terminal in accordance with an embodiment of the present invention.

FIG. 1 is a block diagram of a mobile terminal 100 in accordance with an embodiment of the present invention. The mobile terminal 100 may be implemented as a variety of terminal types. Examples of such terminals include mobile phones, user equipment, smart phones, computers, digital broadcast terminals, personal digital assistants, portable multimedia players (PMP), and navigators.

By way of non-limiting example only and for convenience and conciseness of the following description, the present invention is illustrated as a mobile phone. It is not intended to limit the scope of the present invention. The teachings of the present invention apply equally to other types of terminals.

FIG. 1 shows the terminal 100 having various components, but it is understood that implementing all of the illustrated components is not a requirement. Greater or fewer components may alternatively be implemented.

FIG. 1 shows a wireless communication unit 110 configured with various components. For example, the wireless communication unit 110 typically includes one or more components which permit wireless communication between the mobile terminal 100 and a wireless communication system or network within which the mobile terminal is located. In case of non-mobile terminals, the wireless communication unit 110 may be replaced with a wired communication unit. The wireless communication unit 110 and wired communication unit may be commonly referred to as a communication unit.

A broadcast receiving module 111 receives a broadcast signal and broadcast associated information from an external broadcast managing entity via a broadcast channel. The broadcast channel may include a satellite channel or a terrestrial channel. The broadcast managing entity may be a system which transmits a broadcast signal or broadcast associated information.

Examples of broadcast associated information include information associated with a broadcast channel, a broadcast program, or a broadcast service provider. For example, broadcast associated information may include an electronic program guide (EPG) of digital multimedia broadcasting (DMB) or electronic service guide (ESG) of digital video broadcast-handheld (DVB-H).

The broadcast signal may be implemented as a TV broadcast signal, a radio broadcast signal, or a data broadcast signal. The broadcast signal may further include a broadcast signal combined with a TV or radio broadcast signal.

The broadcast receiving module 111 may receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T).

The broadcast receiving module may also receive multicast signals. Data received by the broadcast receiving module 111 may be stored in a suitable device, such as memory 160.

The mobile communication module 112 transmits and receives wireless signals to and from one or more network entities, such as a base station or a Node-B. The wireless signals may represent audio, video, multimedia, control signaling, or data.

The wireless Internet module 113 provides Internet access for the terminal. The wireless Internet module 113 may be internally or externally coupled to the terminal 100. Suitable technologies for wireless Internet may include, but are not limited to, WLAN (Wireless LAN)(Wi-Fi), Wibro (Wireless broadband), Wimax (World Interoperability for Microwave Access), and HSDPA (High Speed Downlink Packet Access). The wireless Internet module can be replaced with a wired Internet module in non-mobile terminals. The wireless Internet module 113 and wired Internet module may be commonly referred to as an Internet module.

The short-range communication module 114 facilitates short-range communications. Suitable technologies for implementing this module include radio frequency identification (RFID), infrared data association (IrDA), ultra-wideband (UWB), as well at the networking technologies commonly referred to as Bluetooth™ and ZigBee™.

The position-location module 115 identifies and obtains the location of the terminal 100. The position-location module 115 may be implemented using global positioning system (GPS) components which cooperate with associated satellites and network components.

The audio/video (A/V) input unit 120 provides audio or video signal input to the terminal 100. The A/V input unit 120 may include a camera 121 and a microphone 122. The camera 121 receives and processes image frames of still pictures or video.

The microphone 122 receives an external audio signal while the portable device is in a particular mode, such as a phone call mode, a recording mode, or a voice recognition mode. The audio signal is processed and converted into digital data. The terminal 100 and A/V input unit 120 may include assorted noise removing algorithms to remove noise generated in the course of receiving the external audio signal.

Data generated by the A/V input unit 120 may be stored in the memory 160, utilized by the output unit 150, or transmitted via one or more modules of communication unit 110. The terminal 100 may include two or more microphones and cameras.

The user input unit 130 generates input data in response to user manipulation of an associated input device or devices. Examples of such devices include a keypad, a dome switch, a touchpad, a jog wheel, and a jog switch.

The sensing unit 140 provides status measurements for various aspects of the terminal 100. For example, the sensing unit may detect an open and closed state of the terminal 100, relative positioning of components of the terminal, a change of position of the terminal, a change of position of a component of the terminal, a presence or absence of user contact with the terminal, orientation of the terminal, or acceleration or deceleration of the terminal. The sensing unit 140 may also sense the presence or absence of power provided by the power supply 190 and the presence or absence of a connection between the interface unit 170 and an external device.

The interface unit 170 may be implemented to connect the terminal with an external device. External devices include wired or wireless headphones, external chargers, power supplies, storage devices configured to store data, or microphones. The interface unit 170 may be configured using a wired and wireless data port, audio input/output (I/O) ports, or video (I/O) ports. The interface unit 170 may also include a card socket for connecting various cards, such as a memory card, a subscriber identity module (SIM) card, a user identity module (UIM) card, or a replaceable user identity module (RUIM) card.

The output unit 150 outputs information associated with the terminal 100. The display 151 is typically implemented to display information associated with the terminal 100. For example, the display 151 may provide a graphical user interface which includes information associated with a phone call if the terminal is operating in a phone call mode. The display 151 may display images which are associated with various modes, such as a video call mode or a photographing mode.

The display 151 may be configured as a touch screen working in cooperation with the input unit 130, in one embodiment of the present invention. This configuration allows the display 151 to function both as an output device and an input device.

The display 151 may be implemented using known display technologies such as a liquid crystal display (LCD), a thin film transistor-liquid crystal display (TFT-LCD), an organic light-emitting diode display (OLED), a flexible display, or a three-dimensional display. The terminal 100 may include one or more of such displays. An example of a two-display embodiment is one in which one display 151 is configured as an internal display which is viewable when the terminal is in an opened position and a second display 151 configured as an external display which is viewable in both the open and closed positions.

The touchscreen may be configured to detect a touch input pressure in addition to a touch input position and a touch input area.

FIG. 1 further shows the output unit 150 having an audio output module 152. The audio output module 152 may be implemented using one or more speakers, buzzers, or other audio producing devices.

The audio output module 152 functions in various modes including a call-receiving mode, a call-placing mode, a recording mode, a voice recognition mode, or a broadcast reception mode. The audio output module 152 outputs audio related to a particular function, such as a call notification, a message notification, or an error notification.

The output unit 150 is further illustrated having an alarm module 153, which may be used to identify the occurrence of an event associated with the mobile terminal 100. An example of such output includes providing a vibration as a notification to a user.

The alarm module 153 may vibrate when the terminal 100 receives a call or message. Vibration may also be provided by the alarm module 153 in response to receiving user input at the terminal 100, thereby providing a tactile feedback mechanism. It is understood that the various outputs provided by the components of output unit 150 may be performed separately or performed using any combination of the components.

A memory 160 may store various types of data to support the processing, control, and storage requirements of the mobile terminal 100. Examples of such data include program instructions for applications operating on the mobile terminal 100, contact data, phonebook data, messages, pictures, and video.

Additionally, data for various patterns of vibration and sound output in response to a touch input on the touchscreen may be stored in the memory 160. Details of the various patterns of vibration and sound will be explained below.

The memory 160 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 controls the overall operations of the terminal. For example, the controller 180 performs the control and processing associated with voice calls, data communications, video calls, camera operations, and recording operations.

Additionally, the controller 180 may perform a pattern recognizing process for recognizing a handwriting input or a picture drawing input on the touchscreen as characters or images.

The controller may include a multimedia module 181 which provides multimedia playback. The multimedia module 181 may be configured as part of the controller 180 or may be implemented as a separate component.

The power supply 190 provides power to the various components of the terminal 100. The power provided may be internal power or external power.

Various embodiments described herein may be implemented in a computer-readable medium using computer software. The various embodiments may also be implemented in hardware.

A hardware implementation may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. Some embodiments are implemented by controller 180.

A software implementation of the embodiments described herein may be implemented with separate software modules, such as procedures and functions, each of which perform one or more of the functions and operations described herein. The software code may be implemented with a software application written in any suitable programming language and may be stored in the memory 160 for execution by the controller 180 or a processor.

The mobile terminal 100 may be implemented in a variety of different configurations. Examples of such configurations include folder-type, slide-type, bar-type, rotational-type, and swing-type.

For clarity, further disclosure will primarily relate to a slide-type mobile terminal 100. However such teachings apply equally to other types of mobile terminals 100.

Figure 2:
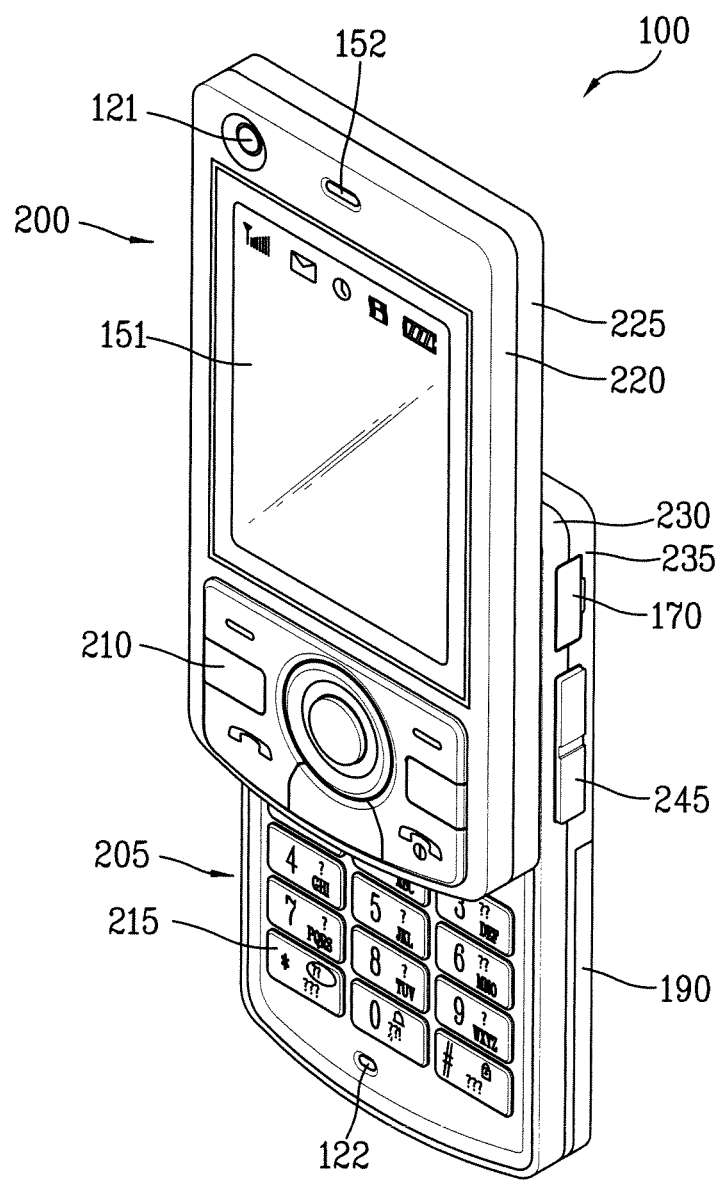
FIG. 2 is a perspective diagram of a front side of a mobile terminal according to an embodiment of the present invention.

FIG. 2 is a perspective view of a front side of a mobile terminal 100 according to an embodiment of the present invention. As illustrated in FIG. 2, the mobile terminal 100 is shown having a first body 200 configured to slidably cooperate with a second body 205.

The user input unit 130 described in FIG. 1 may include a first input unit such as function keys and four directional keys 210, a second input unit such as keypad 215 and a third input unit such as side keys 245. The function keys 210 are associated with the first body 200, and the keypad 215 is associated with the second body 205. The keypad may include various keys such as numbers, characters, and symbols to enable a user to place a call, prepare a text or multimedia message, and otherwise operate the mobile terminal 100.

The first body 200 slides relative to the second body 205 between open and closed positions. Although not shown in drawings, in a folder-type mobile terminal, a first body thereof folds and unfolds relative to a second body thereof between open and closed positions. In addition, in a swing-type mobile terminal, a first body thereof swings relative to a second body thereof between open and closed positions.

The first body 200 is positioned over the second body 205 in the closed position such that the keypad 215 is substantially or completely obscured by the first body. The user may access the keypad 215, the display 151, and function keys 210 in the open position. The function keys 210 may be configured for a user to enter commands such as 'start', 'stop', or 'scroll'.

The mobile terminal 100 is operable in either a standby mode or an active call mode. Typically, the terminal 100 functions in the standby mode when in the closed position and in the active mode when in the open position. The mode configuration may be changed as required or desired by the user.

The first body 200 is formed from a first case 220 and a second case 225 and the second body 205 is formed from a first case 230 and a second case 235. The respective first and second cases may be formed from a suitably rigid material, such as injection molded plastic, or formed using metallic material, such as stainless steel (STS) and titanium (Ti).

One or more intermediate cases may be provided between the first case 220 and second case 225 of the first body 200 or between the first case 230 and second case 235 the second body 205. The first body 200 and the second body 205 may be sized to house electronic components necessary to support operation of the mobile terminal 100.

The first body 200 is illustrated having a camera 121 and audio output module 152. The camera 121 may be selectively positioned such that the camera may rotate or swivel relative to the first body 200.

The function keys 210 are positioned adjacent to a lower side of the display 151. The display 151 is implemented as an LCD. The display 151 may also be configured as a touchscreen having an underlying touchpad which generates signals responsive to user contact with the touchscreen.

The second body 205 is illustrated having a microphone 122 positioned adjacent to the keypad 215 and side keys 245 positioned along the side. The side keys 245 may be configured as hot keys, such that the side keys are associated with a particular function of the terminal 100.

An interface unit 170 is positioned adjacent to the side keys 245. A power supply 190 in a form of a battery is located on a lower portion of the second body 205.

Figure 3:
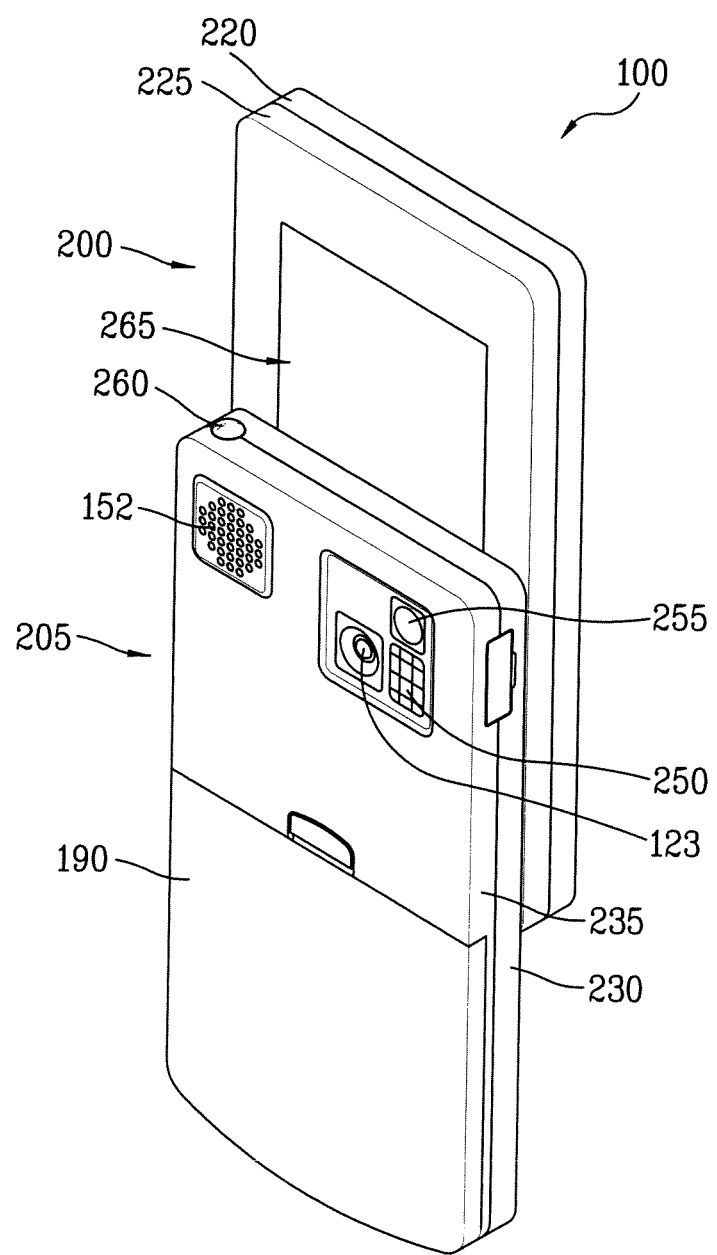
FIG. 3 is a perspective diagram of a backside of the mobile terminal shown in FIG. 2.

FIG. 3 is a rear view of the mobile terminal 100 shown in FIG. 2. As illustrated in FIG. 3, the second body 205 includes a camera 123, a flash 250, and a mirror 255.

The flash 250 operates in conjunction with the camera 123. The mirror 255 is useful for assisting a user to position the camera 123 in a self-portrait mode.

The camera 123 of the second body 205 faces a direction opposite to a direction faced by camera 121 of the first body 200. The camera 121 of the first body 200 and camera 123 of the second body 205 may have the same or different capabilities.

In one embodiment, the camera 121 of the first body 200 operates with a relatively lower resolution than the camera 123 of the second body 205. Such an arrangement works well during a video conference in which reverse link bandwidth capabilities may be limited. The relatively higher resolution of the camera 123 of the second body 205 is useful for obtaining higher quality pictures.

The second body 205 also includes an audio output module 153 configured as a speaker which is located on an upper side of the second body. The audio output module 152 of the first body 200 and the audio output module 153 of second body 205 may cooperate to provide stereo output. Moreover, either or both of the audio output modules 152 and 153 may be configured to operate as a speakerphone.

A broadcast signal receiving antenna 260 is illustrated located at an upper end of the second body 205. The antenna 260 functions in cooperation with the broadcast receiving module 111. The antenna 260 may be fixed or configured to retract into the second body 205.

The rear side of the first body 200 includes a slide module 265. The slide module 265 slidably couples with a corresponding slide module (not illustrated) located on the front side of the second body 205.

It is understood that the illustrated arrangement of the various components of the first body 200 and the second body 205 may be modified as desired. Some or all of the components of one body may alternatively be implemented on the other body. In addition, the location and relative positioning of the components are not critical to many embodiments and, therefore, the components may be positioned at locations which differ from those illustrated by the representative figures.

The mobile terminal 100 may operate in a communication system capable of transmitting data via frames or packets. The communication system may include wired communication, wireless communication, or a satellite-based communication system.

The communication system may utilize various systems such as frequency division multiple access (FDMA), time division multiple access (TDMA), code division multiple access (CDMA), universal mobile telecommunications system (UMTS), long term evolution (LTE) of the UMTS, or the global system for mobile communications (GSM). By way of non-limiting example, further description will relate to a CDMA communication system, but such teachings apply equally to other system types.

Figure 4:
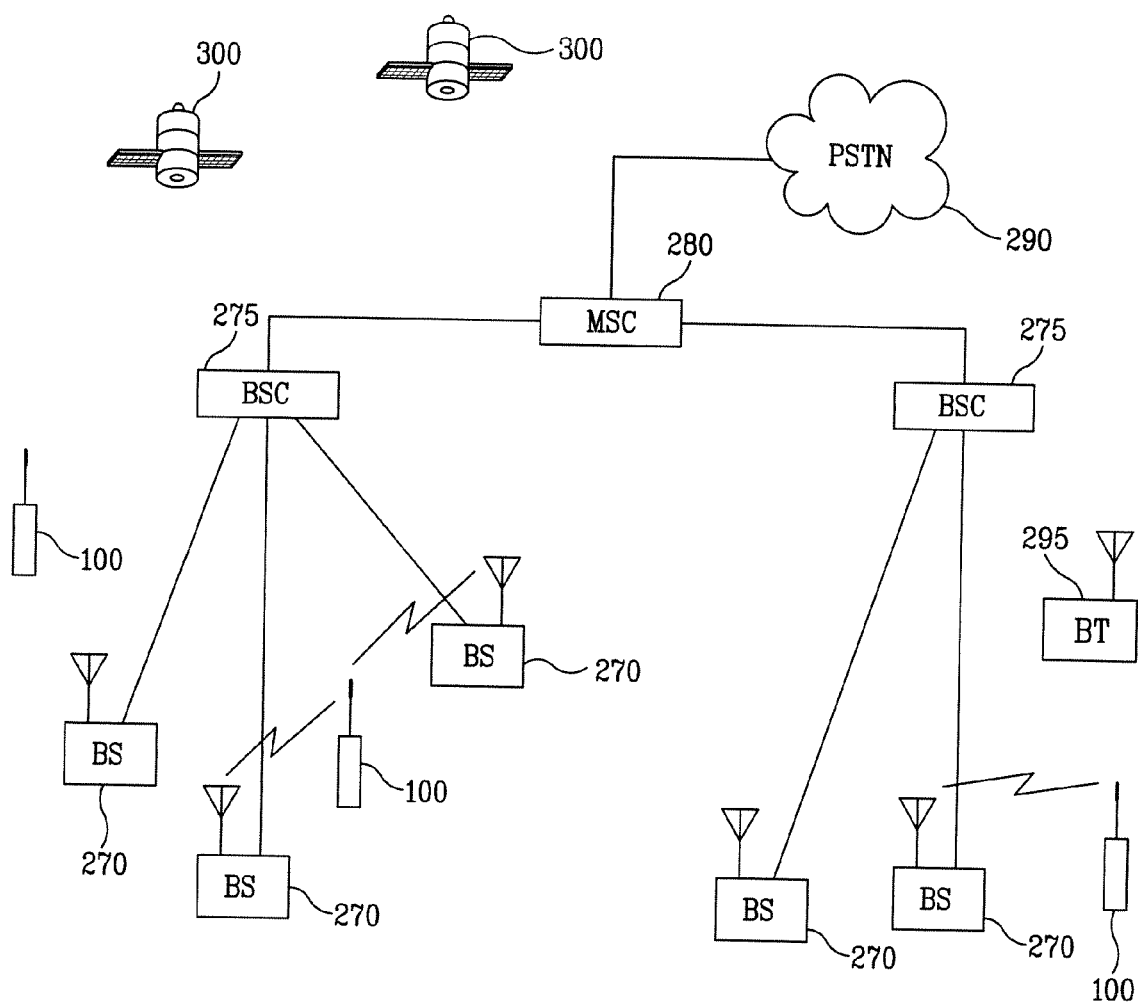
FIG. 4 is a block diagram of a wireless communication system according to the present invention.

As illustrated in FIG. 4, a CDMA wireless communication system is illustrated having a plurality of terminals 100, a plurality of base stations (BS) 270, base station controllers (BSC) 275, and a mobile switching center (MSC) 280. The MSC 280 is configured to interface with a conventional public switch telephone network (PSTN) 290 and is also configured to interface with the BSCs 275.

The BSCs 275 are coupled to the BSs 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omnidirectional antenna or an antenna pointed in a particular direction radially away from the BS 270. Each sector may include two antennas for diversity reception. Each BS 270 may be configured to support a plurality of frequency assignments, with each frequency assignment having a particular spectrum.

The intersection of a sector and frequency assignment may be referred to as a CDMA channel. The BSs 270 may also be referred to as base station transceiver subsystems (BTSs). In an alternate embodiment, the term "base station" may be used to refer collectively to a BSC 275 and one or more BSs 270.

The BSs 270 may also be denoted "cell sites." Alternatively, individual sectors of a given BS 270 may be referred to as cell sites.

A broadcasting transmitter (BT) 295 is illustrated broadcasting to mobile terminals 100 operating within the system. The broadcast receiving module 111 of the mobile terminal 100 is configured to receive broadcast signals transmitted by the BT 295. Similar arrangements may be implemented for other types of broadcast and multicast signaling.

FIG. 4 also shows several global positioning system (GPS) satellites 300. The GPS satellites 300 facilitate locating the position of some or all of the terminals 100. The position-location module 115 of the mobile terminal 100 is typically configured to cooperate with the satellites 300 to obtain position information.

Other types of position detection technology may be used in addition to or instead of GPS location technology. Some or all of the GPS satellites 300 may alternatively or additionally be configured to provide satellite DMB transmissions.

The BSs 270 receive sets of reverse-link signals from various terminals 100 during operation of the wireless communication system. The terminals 100 are performing calls, messaging, or other communications.

Each reverse-link signal received by a BS 270 is processed within that BS. The resulting data is forwarded to an associated BSC 275. The BSC 275 provides call resource allocation and mobility management functionality including soft handoffs between base stations 270. The BSCs 275 also route the received data to the MSC 280, which provides additional routing services for interfacing with the PSTN 290. Similarly, the PSTN 290 interfaces with the MSC 280 and the MSC interfaces with the BSC 275, which in turn control the BSs 270 to transmit sets of forward-link signals to the terminals 100.

In the following description, a control method applicable to the above-configured mobile terminal 100 is explained with respect to various embodiments. It is understood that the following embodiments can be implemented independently or through combinations thereof.

The following embodiments are more easily implemented if the display module 151 includes a touchscreen. In the following description, a display screen of the touchscreen 151 will be indicated by a reference number 400.

A method of controlling a mobile terminal according to a first embodiment of the present invention is explained with reference to FIG. 5 and FIG. 6 as follows.

Figure 5:
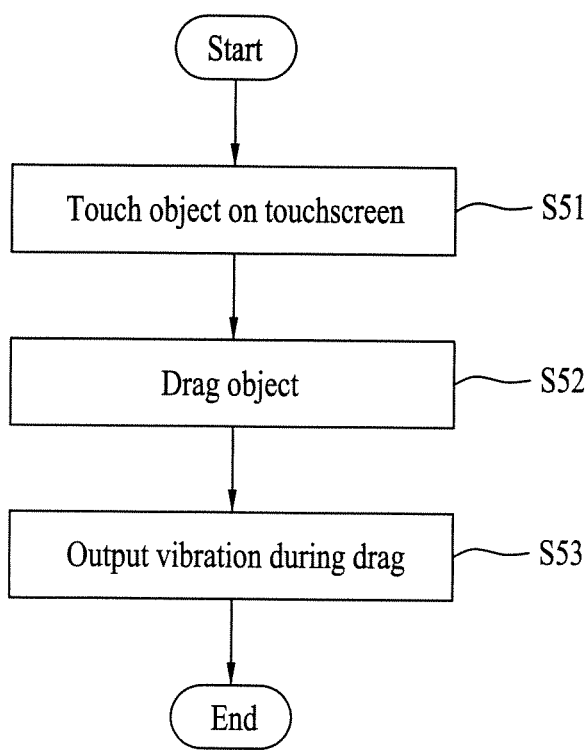
FIG. 5 is a flowchart of a method of controlling a mobile terminal according to a first embodiment of the present invention.

FIG. 5 is a flowchart of a method of controlling a mobile terminal according to a first embodiment of the present invention. FIG. 6 is a state diagram of a display screen on which a method of controlling a mobile terminal according to a first embodiment of the present invention is implemented.

As illustrated in FIG. 5, a user may touch an object on the touchscreen (S51). The object may then be dragged (S52) and the mobile terminal 100 may output a vibration while the object is dragged (S53).

Figure 6:
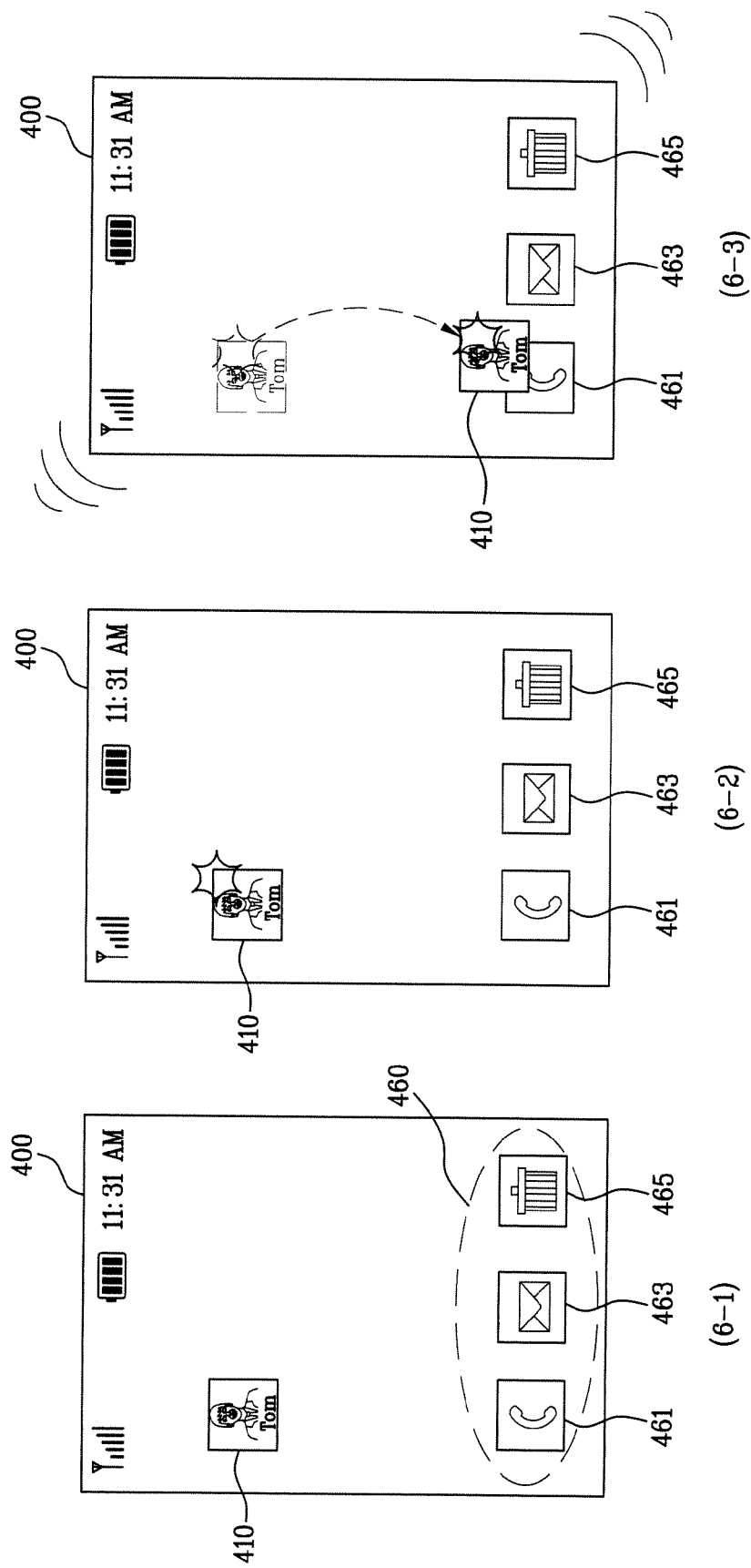
FIG. 6 is a state diagram of a display screen on which a method of controlling a mobile terminal according to a first embodiment of the present invention is implemented.

FIG. 6-1 illustrates an example of a phone number icon 410 displayed on the touchscreen 400 of the mobile terminal 100.

Various menu icons 460 may be displayed on the touchscreen 400. The menu icons 460 may include a phone call icon 461, a message icon 463, and a trashcan icon 465. The mobile terminal 100 may configure a specific menu function if a specific menu icon is dragged and placed on a phone number icon.

If the phone number icon 410 is dragged to one of the menu icons 460, a menu associated with the respective menu icon is executed.

For example, if the phone number icon 410 is dragged to the phone call icon 461, a phone call menu is executed for the phone number associated with the phone number icon 410. If the phone number icon 410 is dragged on the message icon 463, a message sending menu is executed for the phone number associated with the phone number icon 410. If the phone number icon 410 is dragged on the trashcan icon 465, the phone number icon 410 is deleted.

Executing a phone call menu by dragging the phone number icon 410 to the phone call icon 461 is explained in detail as follows.

As illustrated in FIG. 6-2, the phone number icon 410 on the touchscreen 400 is touched with a pointer (S51). FIG. 6-3 illustrates the process of dragging the phone number icon 410 to the phone call icon 461 (S52). The alarm module 153 of the mobile terminal 100 outputs a vibration when the phone number icon 410 is dragged (S53).

The vibration output simulates a vibration felt by a user when an object is dragged on a surface. The phone number icon 410 may correspond to the object and a background image of the touchscreen 400 may correspond to the surface.

The vibration may be output from the time when the phone number icon 410 is touched or dragged. The output of a vibration may terminate when the pointer is released. Additionally, the output of the vibration may terminate when the user has dragged the phone number icon 410 to a desired location but before releasing the pointer.

After the phone number icon 410 has been touched, the vibration may be output when the phone number icon 410 is dragged. However, the vibration is not output if the drag is temporarily interrupted.

If the pointer is touched and dragged, the vibration may be distinguished according to various patterns which include at least one of an area of the icon, a pressure of the touch, or a speed of the shift. The vibration may be distinguished by at least one of a vibration magnitude or a vibration frequency. The distinguished vibration is explained in detail with reference to FIGS. 7 to 9.

Figure 7:
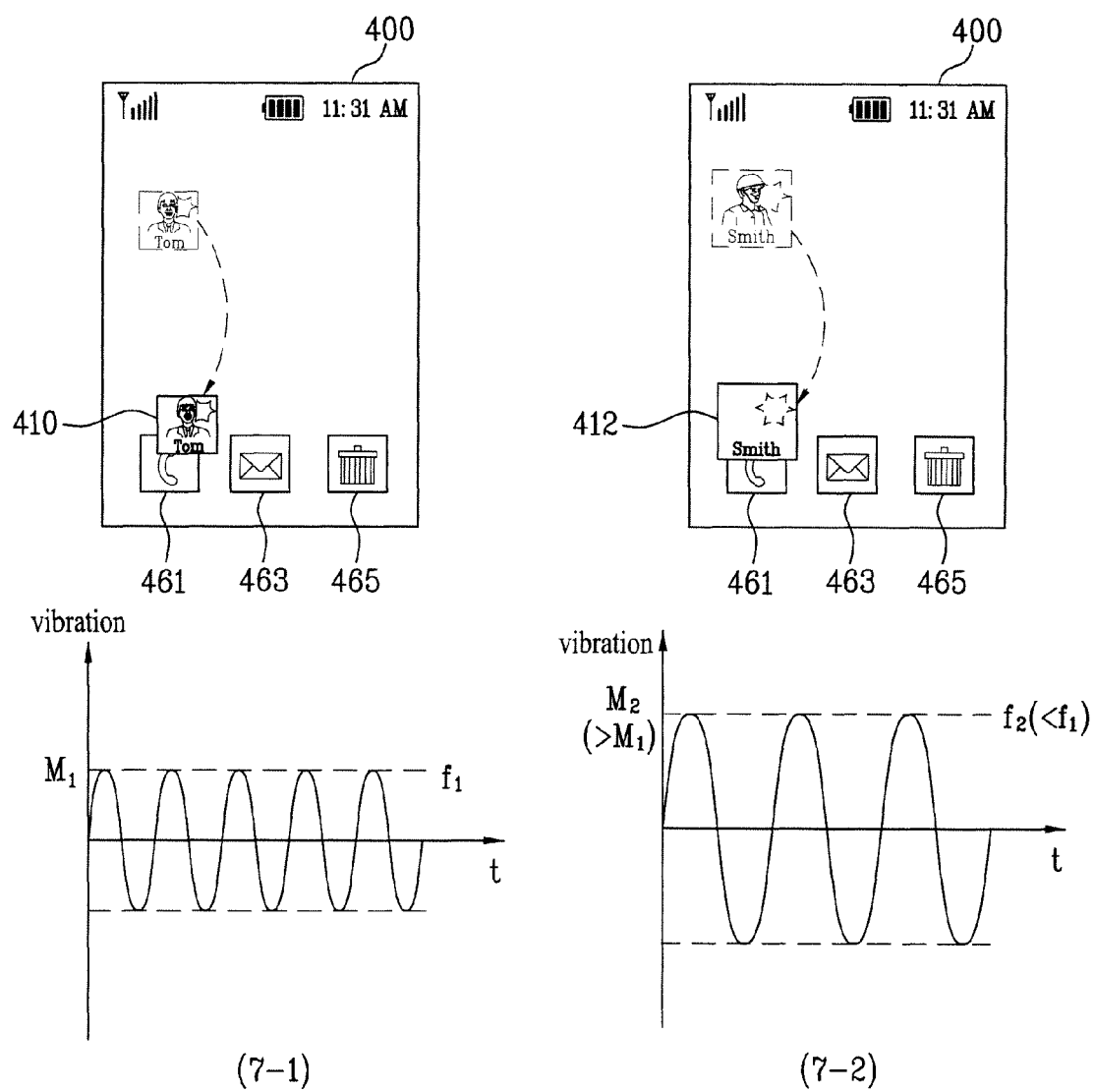
Figure 8:
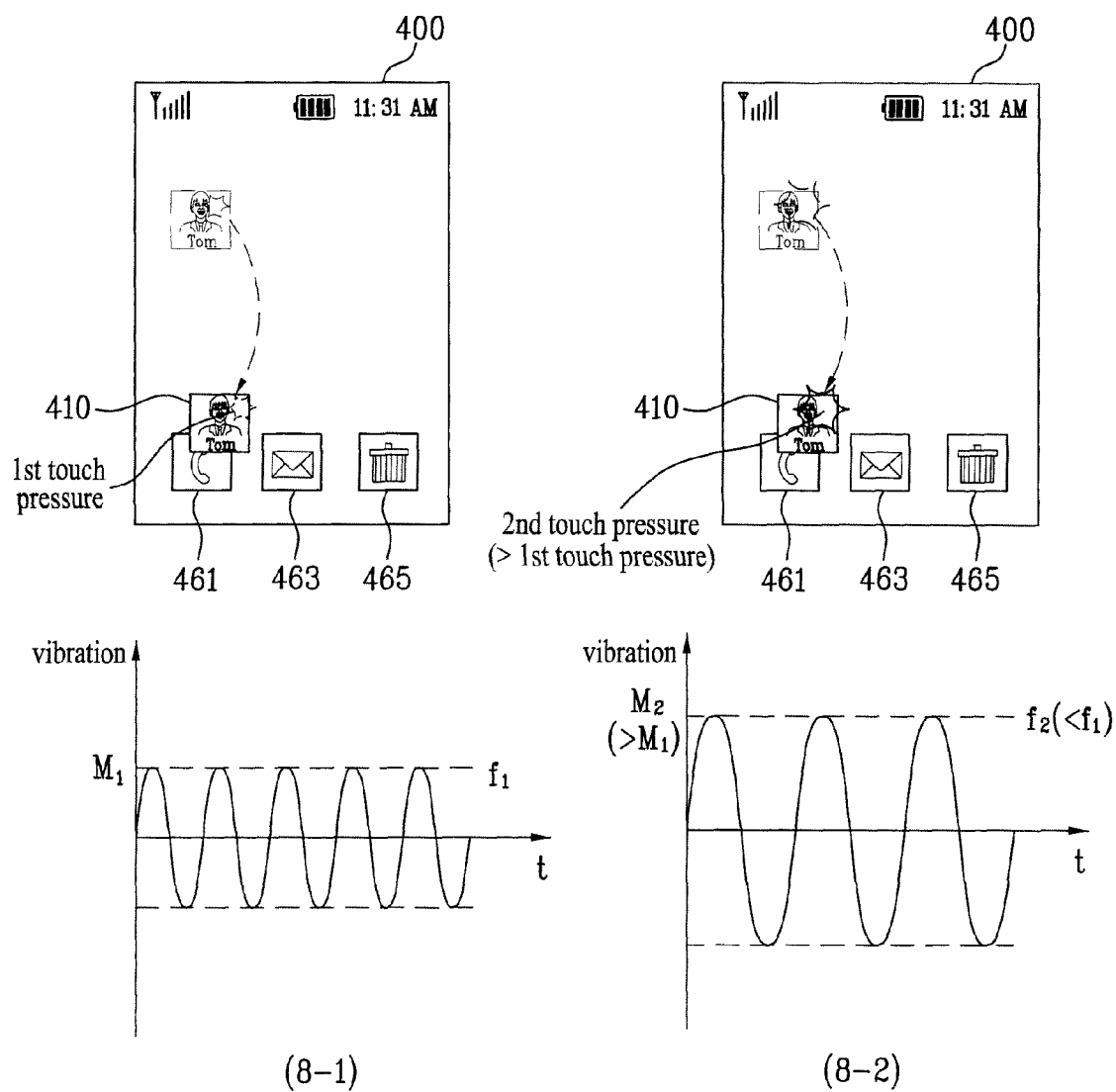

FIGS. 7 to 9 illustrate examples for various patterns of vibration output according to at least one of a size of the icon, a pressure of the touch, or a speed of the drag.

The pattern of the vibration according to a size of the icon is explained with reference to FIG. 7.

FIG. 7-1 illustrates an example of touching and dragging a first phone number icon 410 having a first size. FIG. 7-2 illustrates an example of touching and dragging a phone number icon 412 having a second size.

As illustrated in FIGS. 7-1 and 7-2 the second size is greater than the first size. Therefore, the magnitude of the second vibration may be greater than the magnitude of the first vibration. The vibration may be generated in proportion to a contact area of an object that is dragged. Additionally, the magnitude of the vibration may be greater than the size of the contact area if the contact area is touched with a large force.

Moreover, as illustrated in FIGS. 7-1 and 7-2, the frequency of the second vibration may be lower than the frequency of the first vibration. A vibration with a low frequency may be generated in inverse proportion to the contact area of an object that is dragged. Still, even if a contact area is small, a considerably low vibration frequency may be generated if the small contact area receives a sharp contact.

The pattern of the vibration associated with a touch pressure is explained with reference to FIG. 8.

FIG. 8-1 illustrates an example where the phone number icon 410 is touched and dragged by a first touch pressure. FIG. 8-2 illustrates an example where the phone number icon 410 is touched and dragged by a second touch pressure which is greater than the first touch pressure.

As illustrated in FIGS. 8-1 and 8-2, the first touch pressure generates a first vibration and the second touch pressure generates a second vibration. Since the second touch pressure is greater than the first touch pressure, the magnitude of the second vibration is greater than that of the first vibration. Additionally, the frequency of the second vibration may be less than the frequency of the first vibration.

The pattern of the vibration according to a drag speed of the phone number icon 410 is explained with reference to FIG. 9.

FIG. 9-1 illustrates an example of the phone number icon 410 touched and dragged at a first drag speed. FIG. 9-2 illustrates an example of the phone number icon 410 touched and dragged at a second drag speed.

As illustrated in FIGS. 9-1 and 9-2, the second drag speed is greater than the first drag speed. Additionally, the first drag speed generates a first vibration and the second drag speed generates a second vibration. Since the second drag speed is greater than the first drag speed, the magnitude of the second vibration may be greater than the magnitude of the first vibration. Additionally, the frequency of the second vibration may be less than the frequency of the first vibration.

In the above description, a vibration is output when an icon is touched and dragged on the touchscreen 400. The vibration allows a user to have similar feeling to the vibration that may be generated from dragging a prescribed object on a surface such as a table or a floor.

To enhance the user's experience, a sound may be output which is similar to the sound generated from dragging an object on a surface. The sound may be output together or separate from the vibration. As mentioned above with respect to the vibration, the magnitude and frequency of the sound may be adjusted according to at least one of the size of the icon, the pressure of the touch, or the drag speed.

The present embodiment is applicable to dragging all types of icons. Moreover, the present embodiment is further applicable to dragging a window or other object displayed on the touchscreen.

A method of controlling a mobile terminal according to a second embodiment of the present invention is explained with reference to FIGS. 10 to 13.

Figure 10:
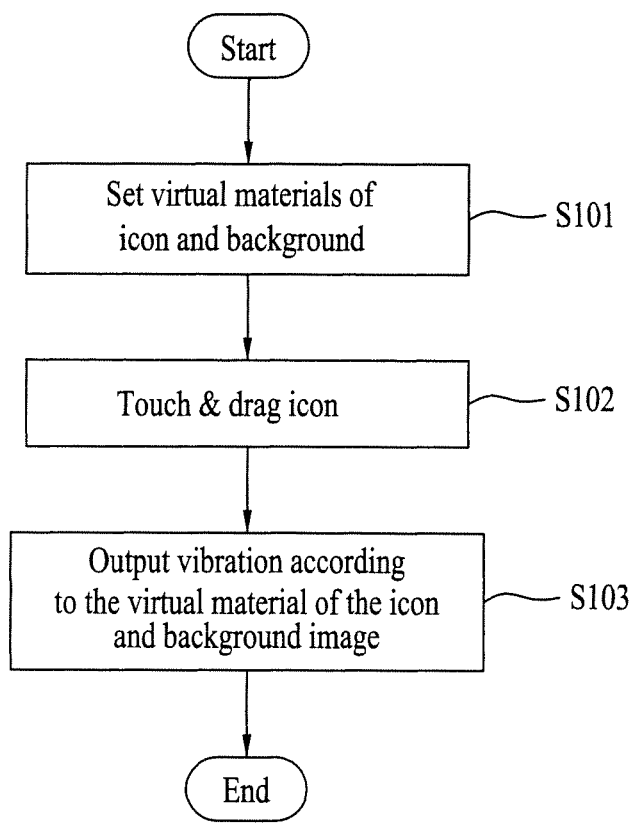
FIG. 10 is a flowchart of a method of controlling a mobile terminal according to a second embodiment of the present invention.
Figure 11:
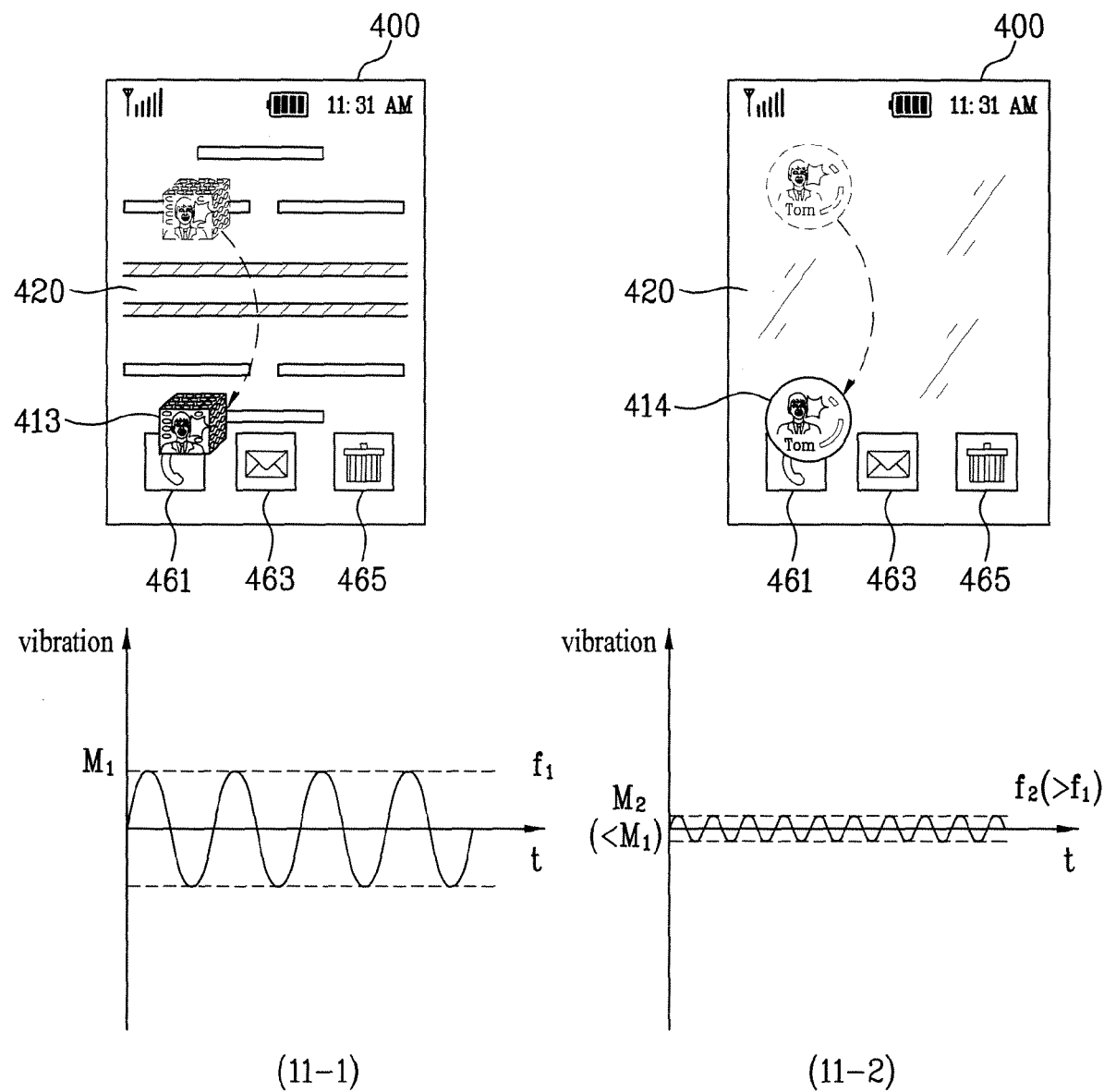
FIGS. 11 to 13 are diagrams for various patterns of vibration outputted by a method of controlling a mobile terminal according to a second embodiment of the present invention.
Figure 12:
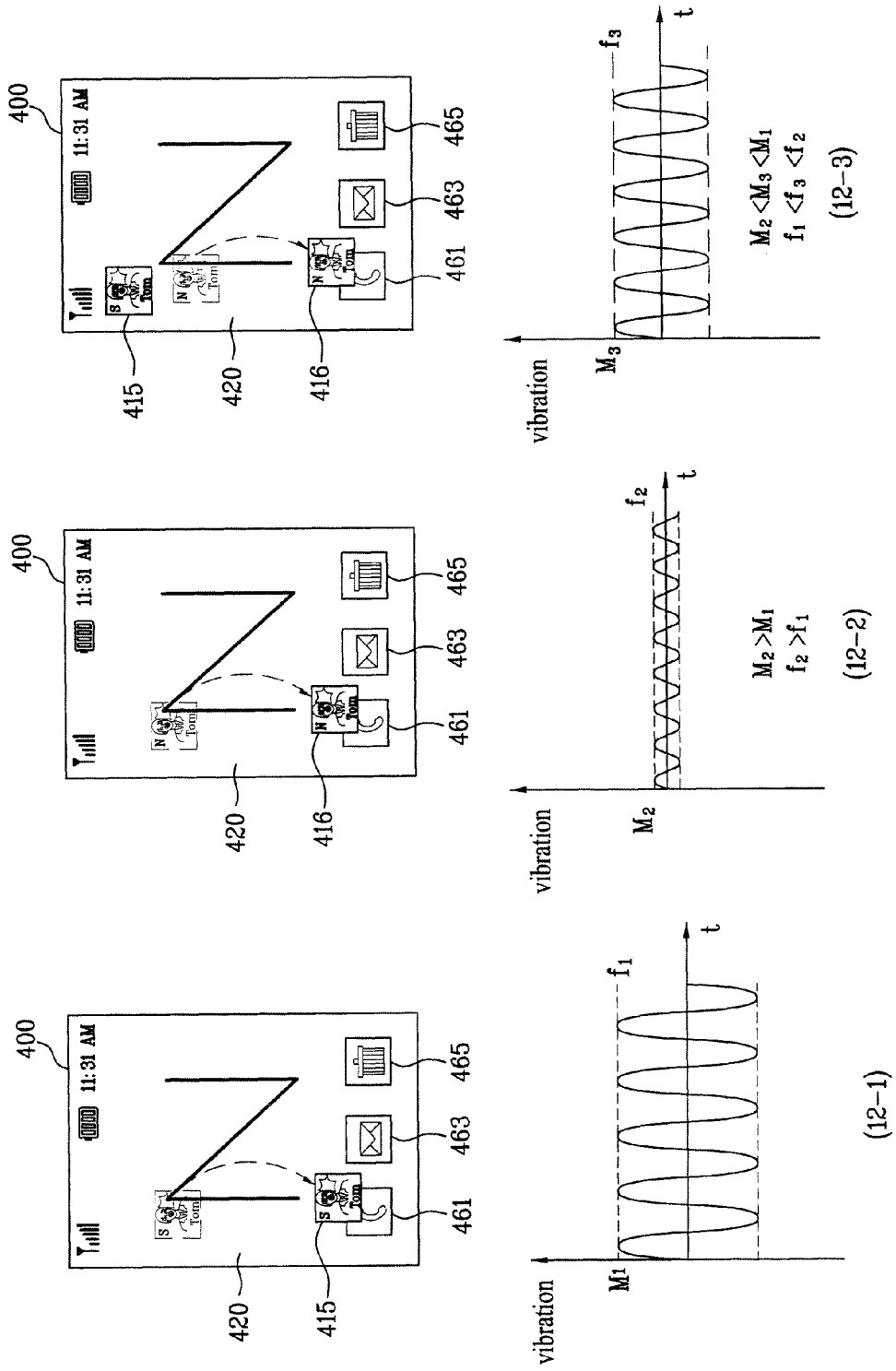
Figure 13:
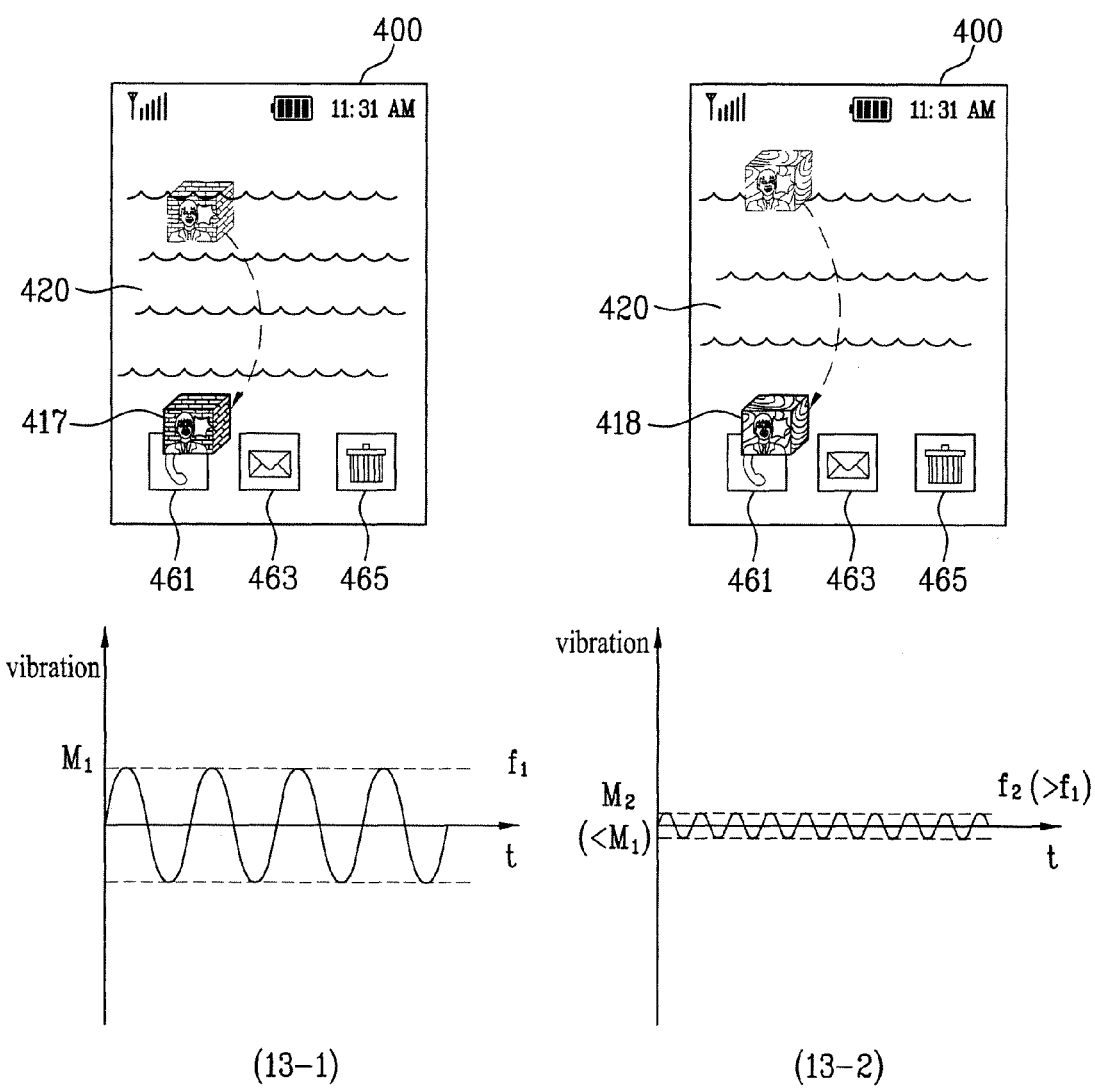

FIG. 10 is a flowchart of a method of controlling a mobile terminal according to a second embodiment of the present invention. FIGS. 11 to 13 are diagrams for various patterns of vibration output by a mobile terminal according to a second embodiment of the present invention.

A virtual material of an icon and a virtual material of a background may be set via the mobile terminal 100 (S101). The icon is then touched and dragged (S102) and a vibration is output according to the virtual material of the object or the virtual material of the background (S103).

For example, the virtual material of the icon may include one of a brick, a bead, or a board. The virtual material of the background may include one of a car lane, an icy road, a paper, or a blackboard. The virtual materials and characteristic data, such as roughness, softness, intrinsic pattern, intrinsic sound, and magnetism, may be stored in the memory 160.

The process of setting the virtual material via the mobile terminal is apparent to those skilled in the art and will be omitted in the following description for clarity.

FIG. 11-1 illustrates an example of a virtual material of a first icon 413 as a brick and a virtual material of a first background 420 as a road. FIG. 11-2 illustrates an example that a virtual material of a second icon 414 as a bead and a virtual material of a second background 420 as an icy road.

The virtual material of the first icon 413 and second icon 414 may have an icon shape. Furthermore, the virtual material of the first and second backgrounds 420 may be represented as a background image. The image may be a still picture or a moving picture.

The first icon 413 and second icon 414 are touched and dragged by the same pressure and at the same speed (S102). The output of vibration in each of the cases is explained as follows.

A virtual friction force is generated when an icon is dragged on the touchscreen. The virtual friction force is similar to the friction created when dragging a real object of a real surface. For example, since the first icon 413 is a brick which is dragged over a road the first virtual frictional force between the first icon 143 and the first background 420 may be greater than a second virtual frictional force between the second icon 414 and the second background 420.

The first frictional force and second frictional force respectively generate a first vibration and a second vibration. Since dragging a brick over a road generates more friction compared to dragging a bead over ice, the magnitude of a first vibration may be greater than the second vibration. Additionally, the frequency of the first vibration may be less than the frequency of the second vibration.

The vibration may be generated by simulating a vibration generated from mutual friction between real materials.

As mentioned above, a sound may be output in order to enhance the user's experience. The sound may be similar to a sound generated from dragging a real object over a surface. The sound may be output together or separate from the vibration.

The virtual type of the icon and the virtual material of the background may be associated with magnetic material. This will be explained in detail with reference to FIG. 12 as follows.

FIG. 12-1 illustrates an example of a first icon 415 with a virtual magnetism of S (south) and a background 420 with a virtual magnetism of N (north). FIG. 12-2 illustrates an example that of a second icon 416 with a virtual magnetism of N and a background 420 with a virtual magnetism of N.

The first icon 415 and second icon 416 have the same size and are touched and dragged at the same pressure (S102). The vibration output is explained as follows.

A virtual attractive force works between the first icon 415 and the background 420, FIG. 12-1, while virtual repulsive force works between the second icon 416 and the background 420, FIG. 12-2. Therefore, since the first icon 415 is not repulsed from the background 420, a first virtual frictional force between the first icon 415 and the background 420 will be greater than a second virtual frictional force between the second icon 416 and the background 420.

The magnitude of a first vibration associated with the first virtual frictional force may be greater than that of a second vibration associated with the second virtual frictional force. The frequency of the first vibration may be less than the frequency of the second vibration.

FIG. 12-3 illustrates an example of both of the first icon 415 with a virtual magnetism of S, the second icon 416 with a virtual magnetism of N, and the background 420 with a virtual magnetism of N.

If the second icon 416 is touched and dragged a virtual attractive force will be present between the first icon 415 and the second icon 416, whereas a virtual repulsive force will be present between the second icon 416 and the background 420. Therefore, a third virtual frictional force between the second icon 416 and the background 420 has an intermediate value which is less than the first virtual frictional force and greater than the second virtual frictional force.

The magnitude of a third vibration associated with the third virtual frictional force may have an intermediate value which is less than the magnitude of the first vibration and greater than the magnitude of the second vibration. Additionally, a frequency of the third vibration may have an intermediate value which is less than the frequency of the first vibration and greater than the frequency of the second vibration.

As discussed above, the virtual material of the background may include various surfaces. In one example, the surface of the virtual material of the background may include a water surface. This is explained in detail with reference to FIG. 13 as follows.

FIG. 13-1 illustrates an example of the virtual material of a first icon 417 as a brick and a virtual material of the background 420 as water. FIG. 13-2 illustrates an example wherein the virtual material of a second icon 418 as a wood piece that may float and a virtual material of a background 420 as water.

The first icon 415 and second icon 416 have the same size and are touched and dragged under the same pressure and with the same speed. The output of vibration is explained as follows.

A virtual buoyancy does not exist between the first icon 417 and the background 420 since the virtual material of the first icon 417 is brick. Bricks are not buoyant and would not float in water. However, a virtual buoyancy exists between the second icon 418 and the background 420 because the virtual material of the second icon 418 is wood and a wood piece may float in water. As such, a virtual frictional force between the first icon 417 and the background 420 may be greater than a second virtual frictional force between the second icon 418 and the background 420.

The magnitude of a first vibration associated with the first virtual frictional force may be greater than the magnitude of a second vibration associated with the second virtual frictional force. Additionally, a frequency of the first vibration may be less than the frequency of the second vibration.

A method of controlling a mobile terminal according to a third embodiment of the present invention is explained with reference to FIG. 14 and FIG. 15 as follows.

Figure 14:
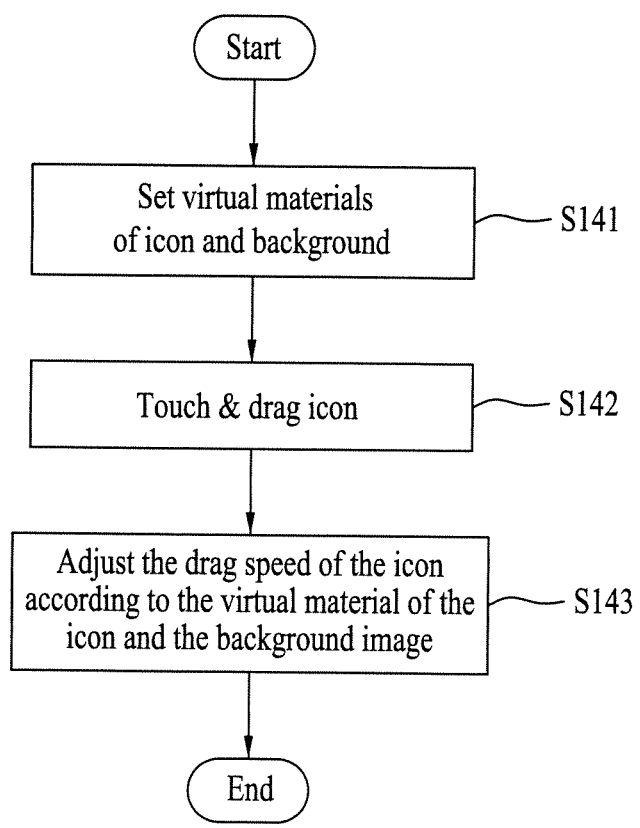
FIG. 14 is a flowchart of a method of controlling a mobile terminal according to a third embodiment of the present invention.

FIG. 14 is a flowchart of a method of controlling a mobile terminal according to a third embodiment of the present invention. FIG. 15 is a state diagram of a display screen on which a method of controlling a mobile terminal according to a third embodiment of the present invention is implemented.

A virtual material of an icon and a virtual material of a background of the icon may be set via the mobile terminal 100 (S141). The icon may then be touched and dragged (S142) and drag speed of the icon is adjusted according to the virtual material of the icon and the virtual material of the background (S143).

The virtual materials of the icon and the background are explained in the previous embodiment and their details will be omitted in the following description.

FIGS. 15-1 and 15-2 illustrate an example of a virtual material of a first icon 413 as a brick and a virtual material of a first background 420 as a street. FIGS. 15-3 and 15-4 illustrate an example of a virtual material of a second icon 414 as a bead and a virtual material of a second background 420 as ice.

The first icon 413 and second icon 414 are touched and dragged by the same pressure and at the same speed. The drag speed of the first and second icons is explained as follows.

A first virtual frictional force between the first icon 413 and the first background 420 may be relatively high because a brick moving over a road would create high amounts of friction. Therefore, if the first icon 413 is dragged at a first speed, the first icon 413 is shifted at a second speed which is less than the first speed. In particular, a drag speed of the first icon is less than a speed of a pointer that may drag the first icon 413 (S143).

Alternatively, a second virtual frictional force between the second icon 414 and the second background 420 may be relatively low because a bead moving over ice creates a low amount of friction. Therefore, if the second icon 414 is dragged at a first speed, the second icon 414 is shifted at a speed which is relatively equal to the first speed (S143).

The differentiated drag speed of the icon may be implemented with at least one of a vibration and a sound discussed in the previous embodiments.

In the description above the drag speed of the icon is adjusted according to the virtual frictional force between the icon and the background. Alternatively, the present embodiment may be configured such that the drag speed of the icon is adjusted according to the virtual magnetism or buoyancy relation between the icon and the background. This is apparent to those skilled in the art and its details will be omitted in the following description for clarity of this disclosure.

A method of controlling a mobile terminal according to a fourth embodiment of the present invention is explained with reference to FIG. 16 and FIG. 17 as follows.

Figure 16:
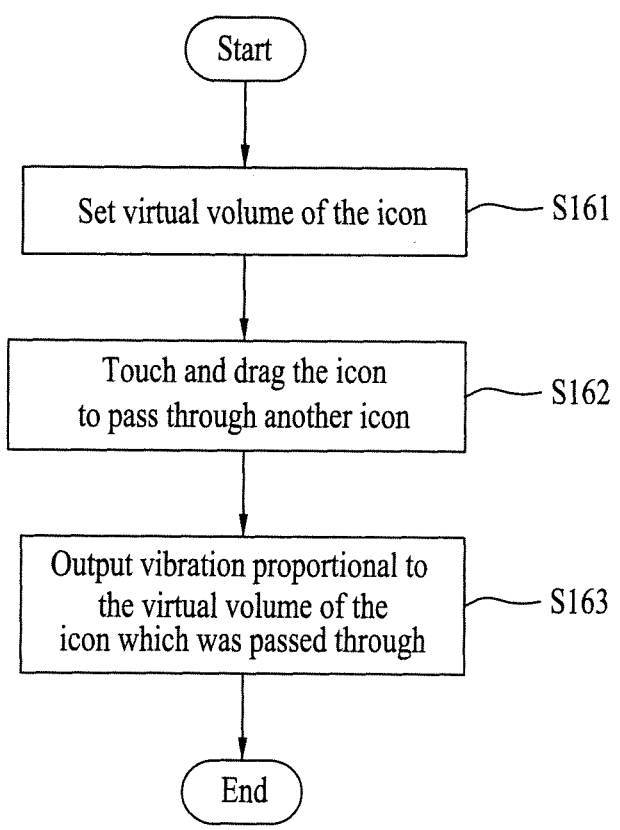
FIG. 16 is a flowchart of a method of controlling a mobile terminal according to a fourth embodiment of the present invention.

FIG. 16 is a flowchart of a method of controlling a mobile terminal according to a fourth embodiment of the present invention. FIG. 17 is a state diagram of a display screen on which a method of controlling a mobile terminal according to a fourth embodiment of the present invention is implemented.

A virtual volume of an icon may be set via the mobile terminal 100 (S161). The icon may then be touched and dragged such that the icon passes through a second icon (S162) and a vibration may be output which is proportional to the virtual volume of the icon which was passed through a second icon (S163).

Figure 17:
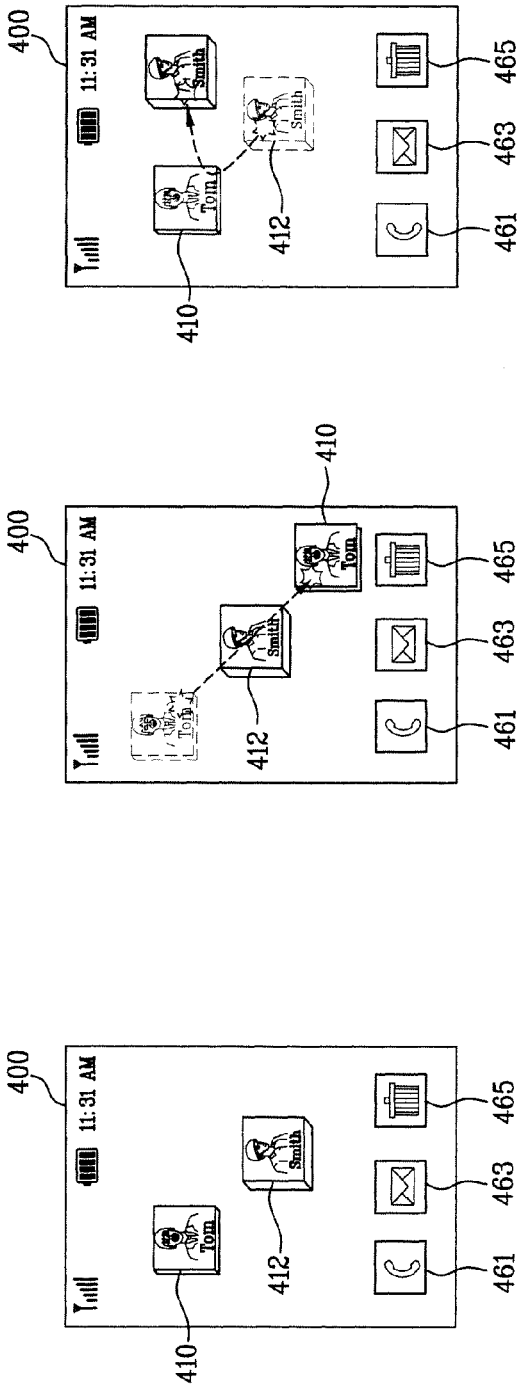
FIG. 17 is a state diagram of a display screen on which a method of controlling a mobile terminal according to a fourth embodiment of the present invention is implemented.

FIG. 17-1 illustrates a first icon 410 and a second icon 412 displayed on the touchscreen 400. A virtual volume may be set for the first icon 410 and the second icon 412. For example, the first icon 410 may have a first volume and the second icon 412 may have a second volume which is greater than the first volume.

As illustrated in FIG. 17-2, the first icon 410 may be touched and dragged to pass through the second icon 412. A vibration with a first magnitude may be output while the first icon 410 passes through the second icon 412. The first magnitude may be proportional to the second volume of the second icon 412.

As illustrated in FIG. 17-3, the second icon 412 may be touched and dragged to pass through the first icon 410. A vibration with a second magnitude may be output while the second icon 412 passes through the first icon 410. The second magnitude may be proportional to the first volume of the first icon 410.

A method of controlling a mobile terminal according to a fifth embodiment of the present invention is explained with reference to FIG. 18 and FIG. 19 as follows.

Figure 18:
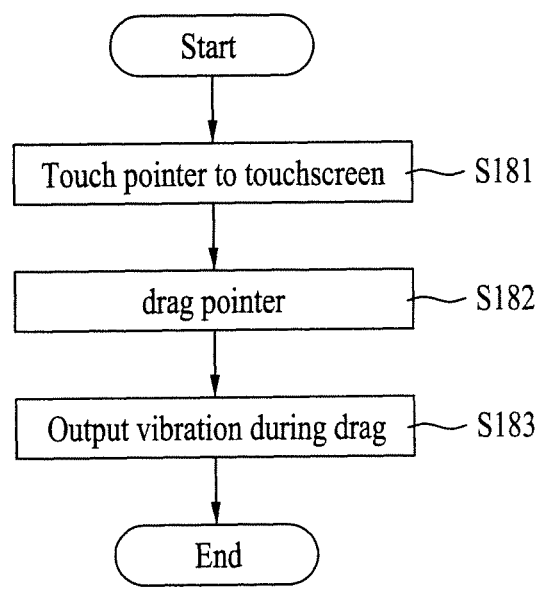
FIG. 18 is a flowchart of a method of controlling a mobile terminal according to a fifth embodiment of the present invention.

FIG. 18 is a flowchart of a method of controlling a mobile terminal according to a fifth embodiment of the present invention. FIG. 19 is a state diagram of a display screen on which a method of controlling a mobile terminal according to a fifth embodiment of the present invention is implemented.

The touchscreen may be touched with a pointer (S181). The pointer may then be shifted on the touchscreen (S182) and a vibration may be output during the shifting of the pointer (S183).

Figure 19:
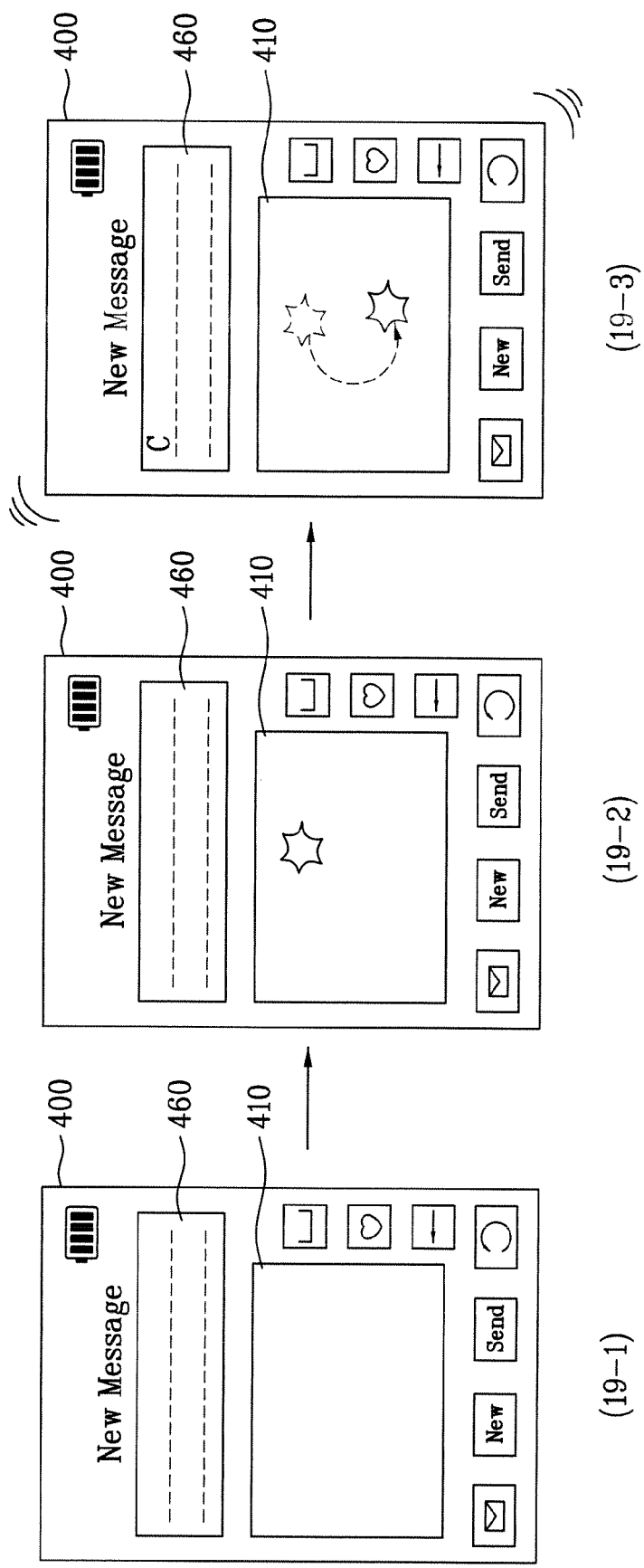
FIG. 19 is a state diagram of a display screen on which a method of controlling a mobile terminal according to a fifth embodiment of the present invention is implemented.

As illustrated in FIG. 19-1, the mobile terminal 100 may enter a message mode. Entering a message mode in a mobile terminal is apparent to those skilled in the art and its details will be omitted in the following description for clarity of this disclosure. The present and following embodiments are applicable to a drawing mode and a mode for inputting characters.

A handwriting input area 410 and a text display area 460 are displayed on the touchscreen 400. The text display area 460 displays text of a pattern recognized from the handwriting input to the handwriting input area 410.

A process for inputting a character 'C' to the handwriting input area 410 is explained as follows.

As illustrated in FIG. 19-2, a pointer is touched to the handwriting input area 410 (S181). The pointer may include a stylus pen or a user's finger.

As illustrated FIG. 19-3, the pointer is dragged in a pattern of the character 'C' (S182). The character 'C' corresponding to the motion of the dragging of the pointer, is displayed on the text display area 460. When the pointer is dragged, the alarm module 153 of the mobile terminal 100 outputs a vibration as illustrated in FIG. 19-3 (S183).

The vibration simulates the vibration that may be felt when a user performs handwriting on a surface such as a paper, a blackboard, or a wall. Specifically, the pointer may correspond to the writing instrument and the handwriting input area 410 may correspond to the handwriting surface.

The vibration may be output from a time when the pointer is touched or a time when the pointer is dragged after being touched. The vibration may continue until a time when the pointer is released or when the pointer stops being dragged before the pointer is released.

When the pointer is touched and dragged, the vibration may be output in various patterns. The various patterns may be determined according to at least one of an area of the touch, a pressure of the touch and a speed of the shift. The vibration patterns may include at least one of a difference in a magnitude of the vibration or a frequency of the vibration. This is explained in detail with reference to FIGS. 20 to 22 as follows.

Figure 21:
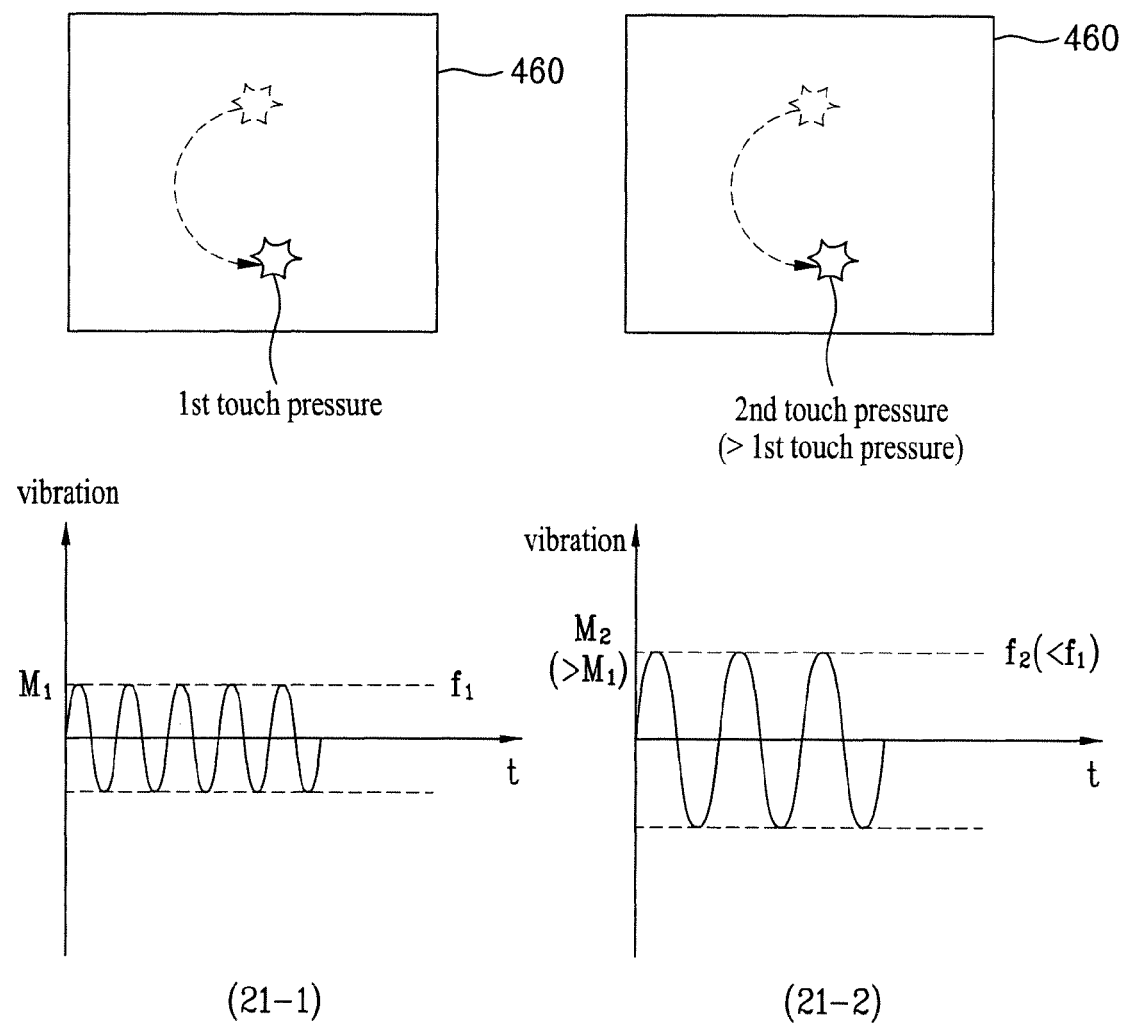

FIGS. 20 to 22 are diagrams for various patterns of vibration output by a mobile terminal according to a fifth embodiment of the present invention. FIGS. 20 to 22 illustrate different graph patterns of vibration output according to at least one of the area of the touch, the pressure of the touch, and the drag speed.

Vibration patterns associated with touch areas are explained with reference to FIG. 20.

FIG. 20-1 illustrates an example of the pointer touching the input area 460. The pointer is touched and dragged with a first touch area. FIG. 20-2 illustrates an example of the pointer touching the input area 460. The pointer is touched and dragged with a second touch area that is larger than the first touch area.

The first touch area and second touch area are respectively associated with a first vibration and a second vibration. The magnitude of the second vibration may be greater than the magnitude of the first vibration. The magnitude of the vibration may be similar to the vibration that is generated in proportion to a contact area of a writing instrument to a surface. Still, a small contact area may be associated with a greater magnitude vibration because a greater vibration may be generated if a small contact area is touched by a sharp tip of a writing instrument.

Additionally, as illustrated in FIGS. 20-1 and 20-2, a frequency of the second vibration may be lower than the frequency of the first vibration. A frequency of vibration may be an inverse proportion to a contact area of a writing instrument. Still, a small contact area may be associated with a low frequency vibration because a lower frequency vibration may be generated if a small contact area is touched by a sharp tip of a writing instrument.

Vibration patterns associated to the touch pressure of the pointer are explained FIG. 21 as follows.

FIG. 21-1 illustrates an example wherein the pointer is touched and dragged on the touch input area 460 with a first touch pressure. FIG. 21-2 illustrates an example wherein the pointer is touched and dragged on the touch input area 460 with a second touch pressure. The second touch pressure illustrated in FIG. 21-2 is greater than the first touch pressure illustrated in FIG. 21-1.

The first touch area and second touch area are respectively associated with a first vibration and a second vibration. The magnitude of the second vibration may be greater than the magnitude of the first vibration. Additionally, a frequency of the second vibration may be less than the frequency of the first vibration. A strong touch pressure is associated with a wider touch area and a low touch pressure is associated with a narrow touch area.

Finally, vibration patterns associated with the touch drag speed of the pointer are explained with reference to FIG. 22.

FIG. 22-1 illustrates an example of a pointer touched and dragged on the touch input area 460 at a first drag speed. FIG. 22-2 illustrates an example of the pointer touched and dragged on the touch input area 460 at a second drag shift speed. The second drag speed is greater than the first drag speed.

The first drag speed and second drag speed are respectively associated with a first vibration and a second vibration. The magnitude of the second vibration may be less than the magnitude of the first vibration. Additionally, a frequency of the second vibration may be greater than the frequency of the first vibration.

In the above description, the vibration is output to enable a user to feel vibrations similar to vibrations generated when performing handwriting on a paper, a blackboard, a wall, or other surface.

Additionally, the present embodiment may output a sound, which is similar to the sound generated from performing writing on surface with a real writing instrument. The sound may be output together or separate from the vibration. As mentioned in the foregoing description, the magnitude and frequency components of the sound may be adjusted according to at least one of the area of the touch, the pressure of the touch, or the drag speed.

A method of controlling a mobile terminal according to a sixth embodiment of the present invention is explained with reference to FIGS. 23 to 25 as follows.

Figure 23:
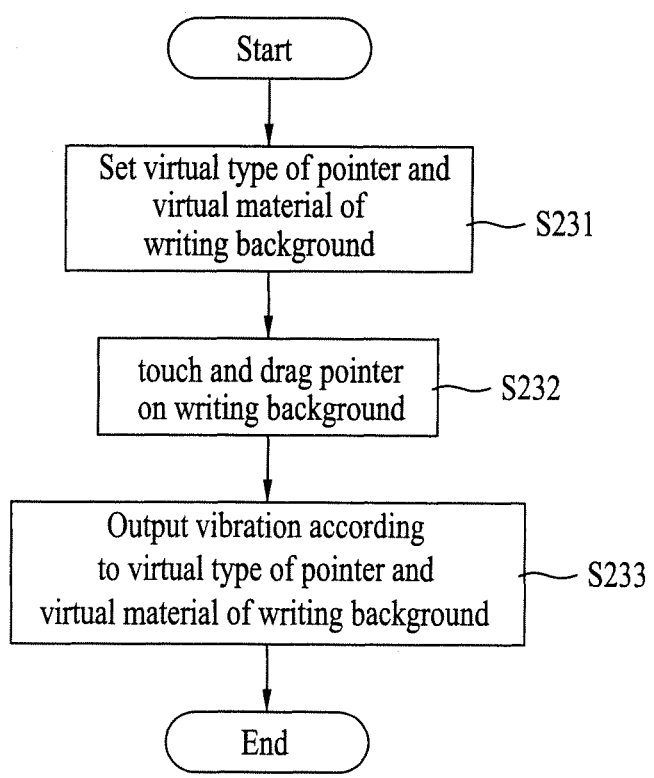
FIG. 23 is a flowchart of a method of controlling a mobile terminal according to a sixth embodiment of the present invention.

FIG. 23 is a flowchart of a method of controlling a mobile terminal according to a sixth embodiment of the present invention. FIG. 24 and FIG. 25 are diagrams for various patterns of vibration outputted by a method of controlling a mobile terminal according to a sixth embodiment of the present invention.

The mobile terminal 100 may be preset by the manufacturer for a virtual type of the pointer and a virtual material of the writing background (S231). Additionally, a user may set a virtual type of the pointer and a virtual material of the writing background (S231). The pointer is touched and dragged on the writing background (S232) and a vibration may be output according to the virtual type of the pointer or the virtual material of the writing background (S233)

The virtual type of the pointer may include one of a ballpoint pen, a pencil, a chalk, a crayon, or a writing brush. The virtual material of the writing background may include one of a paper, a blackboard, a brick wall, a tree. The virtual types of the pointer, the virtual materials of the writing background, and characteristic data, such as roughness, softness, intrinsic pattern, intrinsic sound, may be stored in the memory 160.

FIG. 24-1 illustrates an example of a virtual type of the pointer as chalk and a virtual material of the handwriting input area 410 as a brick wall. FIG. 24-2 illustrates an example of a virtual type of the pointer as a pencil and a virtual material of the handwriting input area 410 as a paper.

As illustrated FIG. 24, the shape of the virtual type of the pointer may be represented as a cursor and the virtual material of the handwriting input area 410 may be represented as a background image of the touch input area.

The first pointer 461 and second pointer 462 may be touched and dragged on the handwriting input area 410 with the same pressure and at the same speed, yet the vibration may be different for each pointer. The vibration output is explained as follows.

A first virtual frictional force between the chalk and the brick wall, FIG. 24-1, may be greater than a second virtual frictional force between the pencil and the paper, FIG. 24-2.

Therefore, the magnitude of a first vibration associated with the first virtual frictional force may be greater than the magnitude of a second vibration associated with the second virtual frictional force. Additionally, a frequency of the first vibration may be less than the frequency of the second vibration.

The vibration between the virtual type of the pointer and the virtual material of the writing background may be configured to simulate the vibration generated from friction between a real writing object and writing surface.

As mentioned in the foregoing description, a sound may be output which is similar to a sound generated from writing on a real writing background with a real writing instrument. The sound may be output together or separate from the vibration.

The vibration may be configured to be output in accordance with the intrinsic pattern of the virtual material of the handwriting input area. This is explained in detail with reference to FIG. 25 as follows.

Figure 25:
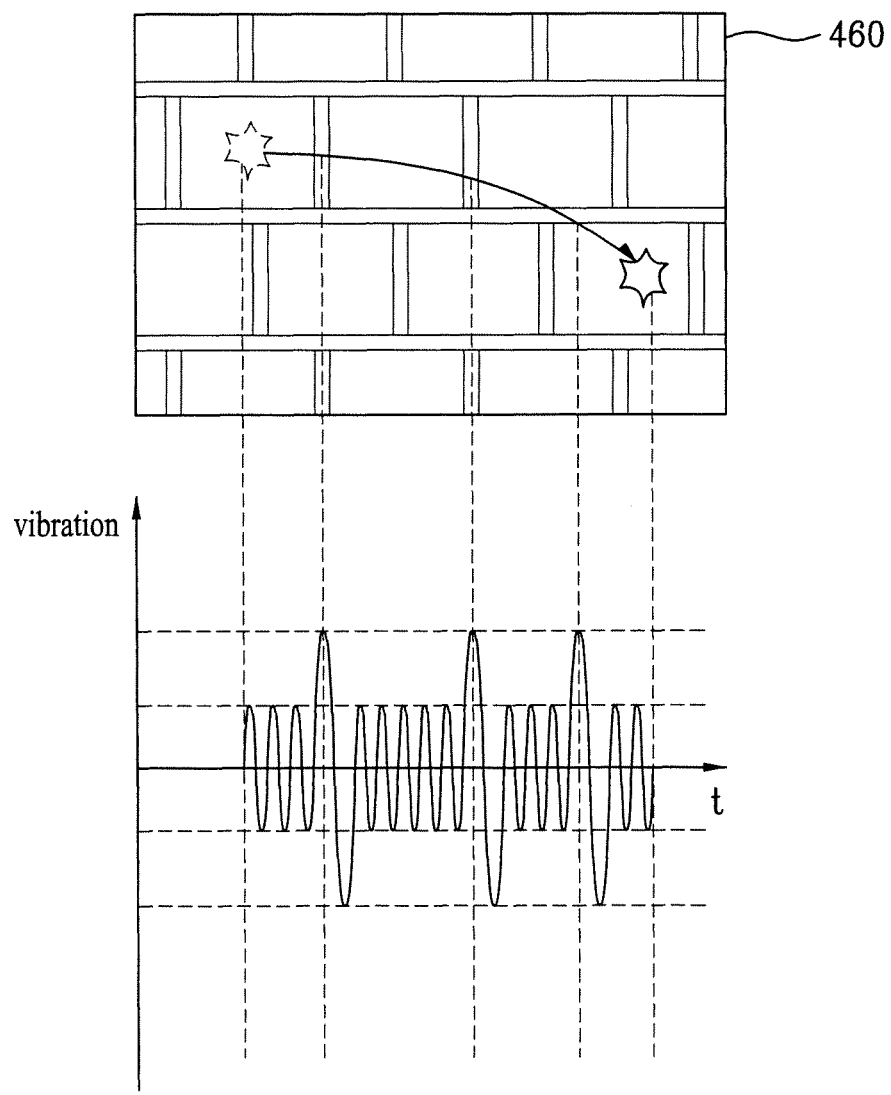

FIG. 25 illustrates an example of a virtual material of the handwriting input as a brick wall. If the pointer is touched and dragged on the brick wall, the vibration will be output according to the intrinsic properties of a brick wall. For example, if the pointer is dragged to an inter-brick groove, then a vibration may be different than the vibration output when the pointer is dragged on a brick. Therefore, a user may sense the inter-brick groove via a difference in the vibration output.

The present invention provides the following effects or advantages. First, according to embodiments of the present invention, a vibration is generated when an object is touched and dragged on a touchscreen of a terminal, whereby a user may recognize that the object is accurately and correctly dragged.

It will be apparent to those skilled in the art that the present invention can be specified into other forms without departing from the spirit or scope of the inventions.

The terminal vibration methods according to the present invention may be implemented with computer-readable codes on a medium having a program recorded thereon. The computer-readable recording media include all kinds of storage devices for storing data that can be read by computer systems, such as ROM, RAM, CD-ROM, magnetic tapes, floppy discs, and optical data storage devices as well as a device implemented with carrier waves, such as transmission via the Internet. The computer may include the controller 180 of the terminal 100.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a touchscreen configured to display an object;
   an output unit configured to output tactile feedback; and
   a control unit configured to:
   control the output unit to output the tactile feedback when the displayed object is selected and moved along a display area of the touchscreen via a contact touch input, and
   control the output unit to adjust the tactile feedback according to a virtual friction of a plurality of virtual frictions between a virtual material of a plurality of virtual materials of the object and a virtual material of a plurality of virtual materials of a background of the display area,
   wherein a material for each of the plurality of virtual materials of the object and for each of the plurality of virtual materials of the background is selectable by a user, wherein the output unit is further configured to automatically adjust the virtual friction according to the selected materials, wherein the virtual material of the object and the virtual material of the background are displayed on the touchscreen, and wherein each of the plurality of virtual frictions provides a different magnitude of tactile feedback.

2. The mobile terminal of claim 1, wherein the control unit is further configured to control the output unit to adjust the tactile feedback according to a size of the object.

3. The mobile terminal of claim 1, wherein the control unit is further configured to control the output unit to adjust the tactile feedback according to a velocity of the object.

4. The mobile terminal of claim 1, wherein the control unit is further configured to control the output unit to adjust the tactile feedback according to a contact pressure between the contact touch input and the touchscreen.

5. The mobile terminal of claim 1,
wherein the control unit is further configured to control an audio unit to output a sound when the object is moved.

6. The mobile terminal of claim 1, wherein
the control unit is further configured to control the output unit to adjust the tactile feedback according to a relationship between the virtual material of the background and the virtual material of the object, wherein the virtual material of the object and the virtual material of the background are magnetic.

7. The mobile terminal of claim 6, wherein the control unit is further configured to control the output unit to adjust the tactile feedback in response to a presence of another object displayed on the display area.

8. The mobile terminal of claim 1, wherein:
the virtual material of the background is water; and
the control unit is further configured to control the output unit to adjust the tactile feedback according to whether the virtual material of the object is a type of material that floats on water.

9. The mobile terminal of claim 1, wherein the control unit is further configured to control the output unit to output the tactile feedback at times other than when a selected object is moved.

10. A method of vibrating providing tactile feedback to a mobile terminal, the method comprising:
displaying an object on a touchscreen;
outputting a tactile feedback when the displayed object is selected and moved along a display area in response to a touch input received at the touchscreen; and
adjusting the tactile feedback according to a virtual friction of a plurality of virtual frictions between a virtual material of a plurality of virtual materials of the object and a virtual material of a plurality of virtual materials of a background of the display area, wherein a material for each of the plurality of virtual materials of the object and for each of the plurality of virtual materials of the background is selectable by a user, wherein a virtual friction is automatically set according to the selected materials, wherein the virtual material of the object and the virtual material of the background are displayed on the touchscreen, and wherein each of the plurality of virtual frictions provides a different magnitude of tactile feedback.

11. The method of claim 10, further comprising adjusting the tactile feedback according to a size of the object.

12. The method of claim 10, further comprising adjusting the tactile feedback according to a velocity of the object.

13. The method of claim 10, further comprising adjusting the tactile feedback according to a contact pressure between the touch input and the touchscreen.

14. The method of claim 10, further comprising outputting a sound when the object is moved.

15. The method of claim 10, further comprising adjusting the tactile feedback according to a relationship between the virtual material of the background and the virtual material of the object, when the virtual material of the background and the virtual material of the object are magnetic.

16. The method of claim 15, further comprising adjusting the tactile feedback according to a presence of another object on the display area.

17. The method of claim 10, further comprising adjusting the tactile feedback according to whether the virtual material of the object is a type of material that floats on water.

18. The method of claim 10, further comprising outputting the tactile feedback at times other than when the selected object is moved.

* * * * *